(12) United States Patent
Kansal et al.

(10) Patent No.: US 9,948,514 B2
(45) Date of Patent: Apr. 17, 2018

(54) OPPORTUNISTICALLY CONNECTING PRIVATE COMPUTATIONAL RESOURCES TO EXTERNAL SERVICES

(71) Applicant: Microsoft Technology Licensing, LLC, Redmond, WA (US)

(72) Inventors: Aman Kansal, Redmond, WA (US); Jie Liu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 467 days.

(21) Appl. No.: 14/319,905

(22) Filed: Jun. 30, 2014

(65) Prior Publication Data

US 2015/0381425 A1 Dec. 31, 2015

(51) Int. Cl.
*G06F 15/173* (2006.01)
*H04L 12/24* (2006.01)
*H04L 12/26* (2006.01)
*H04L 29/08* (2006.01)

(52) U.S. Cl.
CPC ........ *H04L 41/0896* (2013.01); *H04L 41/147* (2013.01); *H04L 43/0888* (2013.01); *H04L 67/1085* (2013.01)

(58) Field of Classification Search
CPC .. H04L 43/0888; H04L 67/1085; G06F 9/505
USPC .................................................. 709/217, 226
See application file for complete search history.

(56) References Cited

U.S. PATENT DOCUMENTS

| 8,037,187 B2 | 10/2011 | Dawson et al. | |
|---|---|---|---|
| 2002/0174052 A1* | 11/2002 | Guler | G06Q 30/08 705/37 |
| 2007/0184820 A1* | 8/2007 | Marshall | G06Q 30/02 455/414.3 |

(Continued)

FOREIGN PATENT DOCUMENTS

WO 2016/003838 A1 1/2016

OTHER PUBLICATIONS

Wang, et al., "Measurement and Utilization of Customer-Provided Resources for Cloud Computing", In Proceedings of the IEEE INFOCOM, Mar. 25, 2012, 9 pages.

(Continued)

*Primary Examiner* — Phuoc Nguyen
(74) *Attorney, Agent, or Firm* — Rainier Patents, P.S.

(57) ABSTRACT

A description of computing resource requirements for execution of an application associated with a publicly available service is obtained. Access to computing resources is opportunistically obtained from a computing entity that includes a private computing device that is external to, and separate from, the publicly available service. The computing resource requirements are intelligently matched to available computing resources of the computing entity with private computing resources that are temporarily available from a private computing device source. The intelligent matching is performed using an optimization analysis.

20 Claims, 11 Drawing Sheets

(56) References Cited

U.S. PATENT DOCUMENTS

| | | | |
|---|---|---|---|
| 2011/0016214 | A1 | 1/2011 | Jackson |
| 2011/0289142 | A1* | 11/2011 | Whalin ............... G06Q 30/02 709/203 |
| 2012/0072762 | A1 | 3/2012 | Atchison et al. |
| 2012/0131591 | A1 | 5/2012 | Moorthi et al. |
| 2012/0290460 | A1 | 11/2012 | Curry, Jr. et al. |
| 2013/0067090 | A1* | 3/2013 | Batrouni ............. H04L 67/1097 709/226 |
| 2013/0304903 | A1 | 11/2013 | Mick et al. |
| 2013/0346969 | A1 | 12/2013 | Shanmuganathan et al. |
| 2014/0089511 | A1* | 3/2014 | McLean ............... G06F 9/5061 709/226 |
| 2014/0164624 | A1* | 6/2014 | Ames ................. G06F 9/45558 709/226 |
| 2014/0280961 | A1* | 9/2014 | Martinez ............. H04L 41/5054 709/226 |
| 2014/0280966 | A1* | 9/2014 | Sapuram ............. G06Q 30/0631 709/226 |
| 2015/0052250 | A1* | 2/2015 | Doganata ............. H04L 47/78 709/226 |
| 2015/0058486 | A1* | 2/2015 | Huang ................ H04L 47/70 709/226 |
| 2015/0100684 | A1* | 4/2015 | Maes ................. G06F 11/3672 709/224 |
| 2015/0163288 | A1* | 6/2015 | Maes ................. H04L 67/10 709/203 |

OTHER PUBLICATIONS

Costa, et al., "Just in Time Clouds: Enabling Highly-Elastic Public Clouds over Low Scale Amortized Resources", In Federal University of Campina Grande/Federal University of Paraíba Technical Report, Sep. 2010, 8 pages.

Goiri, et al., "Characterizing Cloud Federation for Enhancing Providers' Profit", In IEEE 3rd International Conference on Cloud Computing, Jul. 5, 2010, 8 pages.

Teixeira, et al., "User Provided Cloud Computing", In IEEE 10th International Conference on Cluster, Cloud and Grid Computing, May 17, 2010, 6 pages.

"Second Written Opinion Issued in PCT Application No. PCT/US2015/038209", dated Mar. 31, 2016, 7 Pages.

Demand filed Jan. 19, 2016 in PCT Application No. PCT/US2015/038209, filed Jun. 29, 2015, 11 Pages.

International Preliminary Report on Patentability dated Jun. 29, 2016 in PCT Application No. PCT/US2015/038209, filed Jun. 29, 2015, 8 Pages.

"International Search Report and Written Opinion" Issued in PCT Application No. PCT/US2015/038209, dated Oct. 5, 2015, 10 Pages.

Response filed May 15, 2017 to the Communication pursuant to Rules 161(1) and 162 EPC dated Feb. 10, 2017 from European Patent Application No. 15739113.7, 15 pages.

* cited by examiner

OPPORTUNISTICALLY CONNECTING PRIVATE COMPUTATIONAL RESOURCES TO EXTERNAL SERVICES

BACKGROUND

Users of electronic devices are increasingly using external computing resources (e.g., resources in "public clouds") for their computational needs. For example, such external computing resources may include one or more servers that are configured to handle user's needs as various applications are executed. Thus, the user may have access to far more computational resources (e.g., storage, processing power, etc.) than is otherwise available on the user's personal devices.

However, it may be difficult for a publicly available service (e.g., using a "public cloud") to provide adequate computing resources at all times (e.g., during times when many users are requesting services that, in aggregate, require most, or all, of a provider's "public" resources)

SUMMARY

According to one general aspect, a system may include a data processing apparatus that includes a computer-readable storage medium storing executable instructions that cause the data processing apparatus to obtain a description of one or more computing resource requirements for execution of an application associated with a publicly available service, and opportunistically obtain access to computing resources from a computing entity that includes a private computing device. The private computing device is external to, and separate from, the publicly available service. The computing resource requirements are intelligently matched to available computing resources of the computing entity with private computing resources that are temporarily available from a private computing device source. The intelligent matching is performed using a performance optimization analysis.

According to another aspect, a system may include at least one processor, and a computer-readable storage medium that stores executable code that is executable by the processor. The executable code includes an opportunistic resource manager that includes a resource description acquisition module that obtains descriptions of one or more computing resource requirements for execution of one or more applications associated with dynamically changing workloads. The resource description acquisition module is included in a publicly available service. A resource allocator opportunistically obtains access to computing resources from one or more private clouds that are external to, and separate from, the publicly available service, by matching the one or more computing resource requirements to temporarily available computing resources of the one or more private clouds. A public host module initiates control of a hosting activity of execution of the one or more applications, using the matched temporarily available computing resources of the private clouds.

According to another aspect, a computer program product may include a computer-readable storage medium storing executable code that causes at least one data processing apparatus to obtain a description of one or more computing resource requirements for execution of an application. The description of the computing resource requirements is provided to a resource allocator of a publicly available service, the resource allocator configured to opportunistically obtain access to computing resources from a computing entity that includes at least one private computing device that is external to, and separate from, the publicly available service. The computing resource requirements are intelligently matched to available computing resources of the computing entity that includes the at least one private computing device. Control of a hosting activity of execution of the application for one or more users is initiated, using the matched available computing resources of the computing entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

DETAILED DESCRIPTION

I. Introduction

Figure 1:
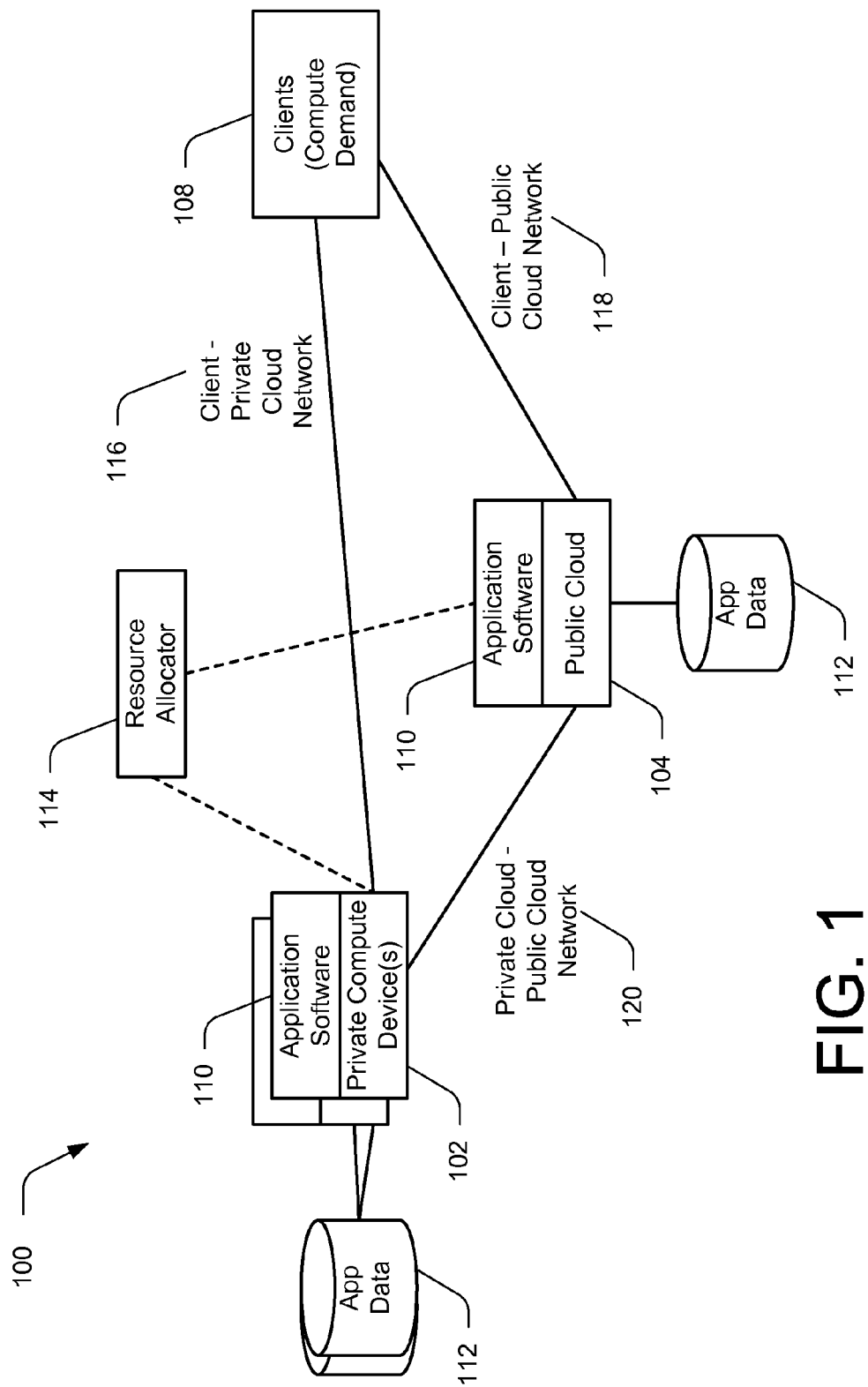
FIG. 1 is a block diagram of an example system for connecting private computational resources to external services.

There are many computational scenarios in which a public cloud cannot be used (or may be undesirable to use, for various reasons) and an on-site, local or regional data center is required (or otherwise more desirable). For example, this may be the case in various scenarios to meet business confidentiality needs for the data or programs run, latency to the users, the need for custom hardware or interfacing with custom systems not available from a public cloud, regulatory requirements such as national boundaries that certain data cannot cross, etc. In this context, these on-site, local or regional data centers or compute resources may be referred to herein as a "private cloud." Private clouds may be limited in that they cannot benefit from the same economies of scale as a public cloud. For example, there may be times when a particular region does not have any demand to be served (e.g., late night time in the region) but there is demand for computational resources in the public cloud.

In this context, "cloud" may refer to a variety of computing concepts that involve one or more devices or computers that may be connected through a communication network such as the Internet. For example, "cloud computing" may refer to distributed computing over a network, and may involve an ability to run a program or application on multiple connected computers. As a concrete example, such a distributed computer system may include the desktop personal computers (PCs) or personal computing devices in an enterprise building that will possess sufficient computing resources to serve their user during office hours but may be idle when the user is away at meetings or after hours.

One skilled in the art of data processing will appreciate that example techniques discussed herein may use a "cloud" or any other remote device (e.g., a remote server, or simpler types of remote devices), without departing from the spirit of the discussion herein.

In accordance with example techniques discussed herein, the above situation may be advantageously resolved by connecting the private clouds to the public cloud, such that the private cloud may sell its unused resources to the public cloud. Somewhat similarly as local electricity generation or environmentally harvested energy can be sold back to a power grid through smart-grid technologies, example smart-cloud technologies as discussed herein may enable selling back available excess computational resource to the public cloud, when there is demand.

However, there are difficulties to be addressed before the idle resources in a private cloud can be used by the public cloud. For example, the network connectivity and compute performance of each private cloud may be different from that of the public cloud by varying amounts. For example, certain private cloud performance characteristics may be substantially degraded compared to the public cloud, and may not be acceptable for serving all types of demand that the public cloud might serve. For example, data storage may require continuous availability that a private cloud may not be able to support. For example, the example techniques discussed herein that compensate the private cloud limitations or adapt the demands of the public cloud consumers to private cloud capabilities may be viewed somewhat as a form of "impedance matching" between the public and private clouds.

Example techniques discussed herein may advantageously resolve (at least) those technical challenges. For example, techniques discussed herein may advantageously resolve issues such as (1) routing demand to an optimal private cloud for a trade-off between high performance and low cost, and (2) ensuring reliable operation with dynamic changes in private cloud availability.

There may be other challenges as well, such as ensuring that the private clouds can run and host the same software as that developed for the public cloud. For example, for some implementations, an appropriate virtualization platform may be used on the private clouds and the public cloud that allows software written for one set of servers to run on any other set of servers. Other example mechanisms, such as dual or multi-boot machines that boot their operating system (OS) into a private usage mode when not selling back capacity to the public cloud, and boot into a public cloud mode at other times, may be employed.

For example, content delivery networks (CDNs) conventionally have addressed the problem of routing demand to the nearest CDN node, but they may not have considered the high variability in availability and performance of the private data centers. For example, while the nearest (in terms of network delay) CDN node (if it has the content to serve) may be optimal for a client, the nearest private cloud may not be optimal for the client because, for example, that private cloud may not currently be available, may not have appropriate computational resources (e.g., network bandwidth, storage, etc.) for a particular client's purposes, or may not be expected to remain available for the entire duration of the particular client's current needs.

Previous solutions to address reliability may not work directly for the dynamic fluctuations in availability of the private clouds. For example, an application may require storing persistent data (e.g., inventory remaining in an ecommerce application) and there may be no private cloud that is always available for such data. Thus, as discussed herein, example reliability mechanisms may be configured to support private clouds in a "smart-cloud" setup.

In accordance with example techniques discussed herein, an example system architecture may ensure the availability of backend data required to host dynamically changing workloads at private cloud locations that become available on a temporary basis.

In accordance with example techniques discussed herein, example techniques may discover current private cloud availability and allocate the availability to current computational demand.

Further, example mechanisms and techniques discussed herein may select a performance-optimal private cloud for a customer's computational needs. For example, such optimal performance may be defined in terms of attributes such as compute throughput, network latency, network bandwidth, and/or storage performance.

Further, example mechanisms and techniques discussed herein may select a performance-optimal private cloud when the customer's compute needs originate from multiple locations (e.g., a website has computational needs to serve clients located in different parts of the world).

Further, example techniques discussed herein may trade-off costs and performance when selecting the best (or most appropriate) available private cloud to serve a current computational demand.

Further, example techniques discussed herein may jointly optimize the allocation of multiple computational loads to multiple available private clouds, to optimize a global metric such as the performance offered to 99% of the clients, the overall revenue, or other metrics.

Further, example techniques discussed herein may dynamically infer load migration requirements and migrate workloads as private cloud availabilities or other costs change.

Further, example mediated auctions mechanisms and techniques discussed herein may match the computational needs of the customer to the best (or most appropriate, or optimal, as determined by the example techniques) performance and price trade-off offered by the various available private clouds.

Further, example techniques discussed herein may provide mechanisms for providing back a private cloud's spare, private computing resources, at times when they can be spared (e.g., available for use by users external to the private cloud), the private compute resources, in a performance and/or standards compatible manner, back to the public cloud.

Further, example techniques discussed herein may provide mechanisms for selecting a set of particular private clouds to host a particular application, and secondarily selecting a subset of that set of private clouds, to serve one or more particular requests received from clients of the particular application. For example, a set of private clouds may be intelligently selected to host NETFLIX, and a respective subsets of that set may then be intelligently selected to serve respective individual NETFLIX client requests to view a movie.

FIG. 1 is a block diagram of an example system 100 for connecting private (e.g., on-premise) computational resources to external services. As shown in the example of FIG. 1, private compute devices 102 represent an example enterprise or personal computing device (e.g., on-site data center, servers in a server room, office personal computers (PCs), laptop, tablet, home PC, etc.) that currently has idle computational capacity to serve any computational demand other than the demands from its local user(s). The number of private compute devices 102 in the system 100 may change over time and may be zero at particular times. The amount of spare capacity available at each of those devices may be time varying and may be zero at particular times. In this context, the private compute devices 102 may be referred to as a "private cloud."

As shown in the example of FIG. 1, public cloud 104 represents a cloud infrastructure that is dedicated to serving applications desired by clients 108. Its design is optimized for such use, and, in some implementations, may have no local users. The computational capacity available in the public cloud 104 may also be time varying (e.g., more capacity available when solar panel output to power up servers is higher). For example, the capacity available may be zero (or substantially close to zero), in a system where all demand (or substantially all demand) is served using the private compute devices 102. In some implementations, the public cloud 104 infrastructure itself need not be localized to one location but may include multiple data centers or servers at multiple locations.

In the example of FIG. 1, clients 108 may represent the users whose compute demand needs to be served by application software 110. For example, for a big data analytics application, the client 108 could be a financial analytics company that wishes to run data analysis jobs and hence needs computational resources. As another example, for a web application, the clients 108 could be website users who wish to access the web content served by the application 110. For example, for a cloud gaming application, the clients 108 could be players who wish to play that game. For example, for a cloud video streaming application, the clients 108 could be viewers who wish to view movies, television shows, videos, etc. For example, clients 108 for specific application software 110 could be in one location or could be spread across multiple locations.

In the example of FIG. 1, application software 110 represents the application that the client 108 wishes to use (e.g., a web site, a web service, batch computing engine, game server etc.). While FIG. 1 shows only one application 110 for simplicity of the following discussion, one skilled in the art of data processing will understand that example techniques discussed herein also apply to multiple applications 110 in the system 100. Further, for some implementations discussed herein, it is assumed that the application software 110 can be hosted on at least a subset of the available private compute devices 102. For example, the application software 110 may not be present at every private compute device 102, and may thus be copied to the appropriate private compute device(s) 102 after a decision has been made to use that specific device (or devices).

In accordance with example techniques discussed herein, if application software 110 requires any modifications to be executed on different private compute devices 102, then different versions of the software 110 may be made available, or automated mechanisms to make those modifications may be used. For example, the public cloud 104 may offer an ASP.NET platform, and the software application 110 may be written using ASP.NET. However, if the private compute device 102 does not offer an ASP.NET platform but only has a WINDOWS OS without ASP.NET, automated techniques may be used to package the application along with the ASP.NET runtime and libraries such that the combined package can run on the WINDOWS OS based private compute device 102. If desired or needed, the application may be packaged with the OS as well. In some instances, a private cloud operator may add hardware needed (or desired) for public cloud usage mode, where such hardware is not used by any local application in the private cloud (e.g., a security co-processor or memory with advanced error correction).

In the example of FIG. 1, app data 112 represents the data that the application software 112 needs to execute. Some or all of the private compute devices 102 may also have the capability to store app data 112, and some of them may be able to maintain this data 112 even when the private device 102 is not itself available (has no spare idle capacity) to serve the demand. For example, this may help avoid having to transfer the data 112 to a private device 102 when it is selected to serve a compute demand, if the data 112 was previously transferred to it. For example, the app data storage 112 at a private device 102 may be absent (or omitted), and in such cases the application software 110 may use the public cloud 104 (e.g., which may in turn use other private clouds) for its data storage needs and only use computational resources at the private device 102. As another example, the app data 112 at a private device 102 may be out of date, and in such cases an update may be performed. In any event, use of app data 112 stored at the private device 102 may advantageously help in reducing network requirements.

In the example of FIG. 1, a resource allocator 114 represents example logic that allocates compute demand (from clients 108) to various available compute service providers in the public 104 and private 102 clouds. For example, the resource allocator 114 may be hosted at the public cloud 104, at a separate server, or as a distributed application running at multiple private clouds and the public cloud 104.

As network components, FIG. 1 also depicts three example network links: (1) Client to the private cloud (private compute devices) (116), (2) Client to public cloud (118), and (3) private cloud to public cloud (120). The relative performance of these network links may differ for different clients 108 and private cloud devices 102. For example, if the client 108 is using a broadband Internet connection, and the private cloud has an enterprise network connection (e.g., T1 line) to the Internet, while the public cloud 104 has a core network connection to the Internet, then the client 108 may have the "best" connection to the public cloud 104, and slightly worse connection to the private cloud. In this example, the network link available to the private cloud to transfer the application software 110 and app data 112 to itself may be quite fast for many applications. As another example, if the client 108 is a laptop connected to an airport hot-spot, the private cloud device 102 is another laptop connected to the same airport hotspot, while the public cloud 104 is the same as the previous example, then the client 108 likely has a better network link to the private cloud (local area network) while the link to the public cloud 104 is slower. Also, the private cloud in this case may have a relatively slow connection to transfer application software 110 and app data 112 to itself.

In the discussion below, several example techniques are presented for determining connections between private cloud resources and external resources, in accordance with client needs. Such example techniques may include (at least) discovery based techniques, performance based techniques, performance and cost based techniques, multi-application techniques, and dynamic allocation techniques.

For example, a goal of discovery based techniques is to make available spare capacity usable by clients 108 in need of computational services (e.g., which may not directly consider performance or cost). The focus of such discovery based techniques is on discovering the available resources.

In order for the spare private cloud capacity to be usable by a client 108, the existence of spare capacity is known to the client, and the spare capacity has sufficient compute resources (e.g., CPU, network, storage, etc.) to serve the client needs; there exists a network link from the client 108 to the spare capacity (e.g., in terms of physical connectivity and permissions to cross relevant firewalls); and the application software is hosted on the private cloud in consideration.

Figure 2:
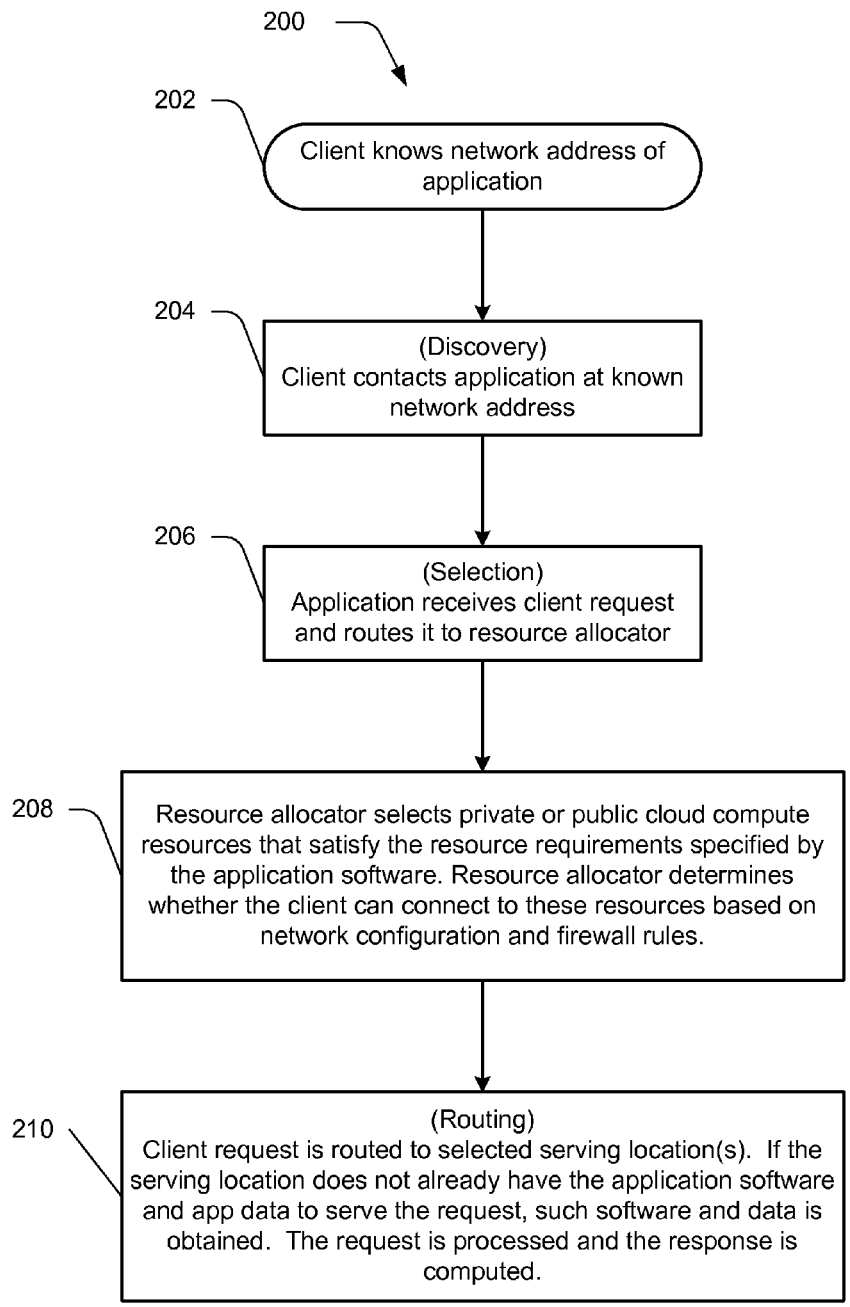
FIG. 2 is a flowchart illustrating example steps for intelligently allocating computational resources that are available on private clouds to execute applications from sources external to the private clouds.

In accordance with example techniques discussed herein, the example system 100 may be enabled to satisfy these conditions, if example steps such as discovery, selection, and routing are performed, as shown in FIG. 2, and as discussed below.

FIG. 2 is a flowchart 200 illustrating example steps for intelligently allocating computational resources that are available on private clouds to execute applications from sources external to the private clouds.

In this context, "intelligently" refers to making "intelligent" choices regarding the selection of computational resources that are voluntarily made available by the private clouds. For example, if a public service (e.g., AMAZON, NETFLIX, etc.) wishes host applications that has performance requirements (e.g., streaming movies to customers in an efficient and high performance manner), then the public service wishes to ensure that "voluntary" resources (e.g. from private hosting entities) are used in an intelligent manner (e.g., not simply connect them and run the software on them, but rather depending on what the application needs, make an intelligent choice as to which volunteer's resources provide the best, or optimal performance for the application's performance, for respective customers of the public service). Thus, the "intelligence" involves example techniques in the selection of the most appropriate resources, for the respective application. For example, if an application's clients are located in Seattle, and a donating computer is located just outside Seattle, then there may be a determination of a "good fit" on network access, but if the application requires a substantial amount of storage, and the donating computer does not have the type of storage needed by the application (e.g., the donating computer has more memory but less hard drive space, but the application needs more hard drive space and not so much memory), then the donating computer may not be an optimal match for application's requirements.

As shown in the example of FIG. 2, at 202 (Discovery), the client already knows the existence of at least one host that can serve the desired application software. For example, this may be the public cloud, but could be any server. The client knowledge may be based on the DNS (Domain Name Server) records for the application the client wishes to access, or through other channels for sharing such information. For example, if a client wishes to access MICROSOFT.COM, then the client can look up existing DNS servers to determine a network address where the MICROSOFT.COM application is available. In this example, at 204, the client contacts the application at this first known network address.

At 206 (Selection), the application receives this client request and routes it to a resource allocator. The resource allocator receives messages from each private cloud that has spare capacity available, detailing the nature of the available capacity. The resource allocator also maintains information about network connectivity and firewall rules to those private clouds.

At 208, the resource allocator uses this information to select private and/or public cloud compute resources that satisfy the resource requirements specified by the application software. It checks to determine whether the client can connect to these resources based on the network configuration and firewall rules. For example, if a private cloud does not allow clients located in Syria to connect to it, and the client request has originated at a Syrian client, then that private cloud will not be considered.

Among the compute resources (private and public) that satisfy the client requirements, one is selected. This selection may be arbitrary or may be based on performance and cost based techniques, as discussed further below.

At 210 (Routing), once a serving location is selected, the client request is routed to it. If this serving location does not already have the application software and app data to serve the request, such software and data is first obtained, for example, from the public cloud or a nearby private cloud (e.g., using peer to peer networking methods). The request is then processed and the response is computed.

If desired by the application software, the client response from that location indicates its own address so subsequent requests from the client can be routed directly to this selected server. The response is sent to the client.

For example, performance based techniques may optimize the selection step in the discovery based techniques. When selecting the compute resource to serve a client, these techniques may consider multiple performance criteria in making the selection. For example, the performance criteria may include factors such as time to first response, average response time over multiple requests, and/or reliability of the cloud.

For example, the time to first response may include the time involved for the selected private or public cloud to compute the response to the first request from the client. For example, this may include the time to obtain the application software and app data at that location.

For example, the average response time over multiple requests may include the time involved, on average, to serve all requests from the client. For example, once the first response has been computed, this may depend on the computational capabilities of the selected server location, the network latency to the client, and the fraction of app data available at this location.

For example, in considering reliability of the cloud, some private clouds may experience more failures than others.

Additional performance criteria may be relevant for certain applications, such as preferring private cloud locations hosted outside of certain geographical areas, private clouds using a specific brand of hardware, etc. Such factors can be included in the example techniques discussed below similarly as discussed above. One skilled in the art of data processing will understand that many other factors may be used, without departing from the spirit of the discussion herein; however, the selected factors above are discussed herein, for clarity of discussion herein.

Further, one skilled in the art of data processing will understand that a cloud that is "best" (e.g., determined as optimal) on performance criteria may not be the "best" (e.g., determined as optimal) on other criteria. For example, a cloud location that is very close to the client may have the most advantageous (as determined in accordance with example techniques discussed herein) average latency over multiple requests, but this cloud location may not have the application software and app data to start with, and obtaining those items may involve a substantially long time to first response. Another cloud location that has all required application software and app data elements may be about to go offline, and so even though it may provide a "good" time to first response (as determined in accordance with example techniques discussed herein), the subsequent requests may not be served, thus involving the selection of an alternate location and causing a "worse" (e.g., less optimal, as determined in accordance with example techniques discussed herein) average request latency.

Given the above problem, an example performance based method may operate as discussed below.

Each performance criterion is assigned a quantitative score. A combined score is calculated by taking a weighted sum of all scores for individual performance metrics. The cloud location that yields the highest score is selected. One skilled in the art of data processing will understand that the maximization of the weighted scores may be performed using any available multi-criteria optimization technique(s). For example, the weights for each factor are dependent on the application and the client preferences. Default values may be used when such information from the application and the client is not available.

Further, example performance and cost based methods may operate as discussed below.

For example, these methods may further enhance the previously presented method to additionally consider the cost of the computational resources and bandwidth. For example, not all private clouds may be available at the same price. As an example, some clouds may have a higher bandwidth cost due to their location and may thus cost more. For example, some others may have a higher energy cost due to energy pricing at that time and location, leading again to a higher cost. For example, some clouds may have local workloads that offer the private cloud owner a particular value and the private cloud may then be made available to the proposed system only if the offered price is higher than the local value. Thus, each private cloud may have an intrinsic cost to offering its resources to serve the current compute demand. An example technique is discussed in more detail below.

For example, a cost factor for an i-th private cloud to offer its compute resources may be denoted as PvtCost(i), where different private clouds (e.g., denoted as $1^{st}$ private cloud, $2^{nd}$ private cloud, . . . i-th private cloud, . . . ) may have different costs at which they are willing to participate in the smart-cloud. For example, a network latency from the public cloud client to the i-th private cloud may be denoted as Lat(i). Further, an example service time of the i-th private cloud (e.g., based on the composition of its computational, memory, storage, and other resources) may be denoted as Svc(i). Given a current state of the data stored at the i-th private cloud, an example start-up cost (e.g., the time to first response) may be denoted as Stp(i). Then, an example weighted cost may be expressed as:

$$C(i)=w1*PvtCost(i)+w2*Lat(i)+w3*Svc(i)+W4*Stp(i)$$

In many situations, the actual network latency, service time, etc. may not be known deterministically, and an example expected value, statistically computed as the first moment of the probability distribution of the specific parameter may be used:

$$E[C(i)]=w1*E[PvtCost(i)]+w2*E[Lat(i)]+w3*E[Svc(i)]+W4*E[Stp(i)]$$

The example optimization problem may then be formulated as:

Select the (i) that minimizes E[C(i)] subject to performance and cost constraints specified by the client (as shown below):

Constraint 1: PvtCost(i)<=min(PubCost, ClientLimit), wherein PubCost denotes the current cost of obtaining resources from the public cloud and may be set to a value of infinity (or other suitable value) if no resources are available in the public cloud, and ClientLimit denotes a maximum cost the client is willing to pay.

Constraint 2: Lat(i)+Svc(i)<=ClientPerfLatencyLimit, wherein ClientPerfLatencyLimit denotes an example worst case performance limit specified by the client (e.g., obtained from, or received from, the client), and Constraint 3: Stp(i)<=ClientStartupLimit, wherein CLientStartupLimit denotes an example maximum delay value acceptable at setup time.

Some or all of the example constraints shown above may be absent in case of particular clients who may be willing to accept any performance while minimizing the cost, or who may want their required performance level at any available cost.

Aside from costs, owners of private clouds may also adapt their prices to demand. For example, a private cloud that offers higher performance than any other competing cloud may be offered at a premium price (e.g., substantially higher than the other competing clouds). As another example, the price may depend on the client location and requirements. For example, the owner of a cloud that is very closely matched to client needs may bid a higher price while the owner of a cloud that is not as suitable (e.g., has higher latency due to distant location) may offer a lower price (e.g., lower than the other competing clouds).

The example performance and cost based methods determine an optimal allocation of the compute demand for the application to the available clouds. The matching is performed based on the cloud prices and the budget that the application has (e.g., has available) to pay for the cloud resources. Example techniques such as multi-criteria optimization, automated auctions, and rule based allocations may be used to perform the matching.

Further, example multi-application methods may operate as discussed below.

In some scenarios, treating each application independently may generate sub-optimal solutions or leave some applications underserved. As discussed herein, and example multi-application method operates similar to the performance and cost based methods discussed above, but it considers multiple applications at once (e.g., considered together). Thus, the matching technique used, such as an optimization solver, auction, or rule based system, includes requirements from multiple application clients in addition to multiple available clouds.

Further, example dynamic allocation methods may operate as discussed below.

In some scenarios, no allocation of private clouds may be feasible to serve the computational load for its desired length of service since no single private cloud may be available for the entire duration. For example, in such scenarios, the allocation may be dynamically modified to use newly available cloud resources that become available over time and release previously allocated (e.g., "older" allocated) resources that are no longer available.

In this example technique, the computational demand is slotted into short time durations (e.g., 1 minute or 30 minutes, depending on the slot duration for which a private cloud operator declares its availability). The performance and cost constraints from the clients and applications are listed for each slot and a dynamic optimization scheme such as dynamic optimization, Viterbi Algorithm, or other multi-slot optimization method is used to optimize the allocation over time.

For example, the Viterbi algorithm is a dynamic programming algorithm for finding the most likely sequence of hidden states (the Viterbi path) that results in a sequence of observed events (e.g., in the context of Markov information sources and hidden Markov models).

In addition to working with given cost or performance constraints, the public cloud may also wish to optimize the compensation offered to private clouds who volunteer their resources to the public cloud. Based on the performance and cost constraints of the client, an example optimization technique may then be used to compute the best (e.g., optimal, most desirable) compensation offers to the private clouds over time. An example optimization objective may thus change from minimizing client cost to maximizing private cloud compensation. Using the variables defined above, the problem may be formulated as:

Select (i) to Maximize PvtCost(i) subject to performance and cost constraints specified by the clients.

The above optimization may be performed over a time horizon of T time slots to maximize the aggregate compensation, or fairness among private clouds, which may be denoted as:

Select (i) at each time slot (t) to maximize the minimum of PvtCost(i) over t=1, . . . , T.

One skilled in the art of data processing will appreciate that many other types of techniques may be used for the analysis and optimization of execution of the applications, without departing from the spirit of the discussion herein.

One skilled in the art of data processing will appreciate that there may be many ways to accomplish the matching of available private computing resources to computational demand associated with external requests from applications as discussed herein, without departing from the spirit of the discussion herein.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 3:
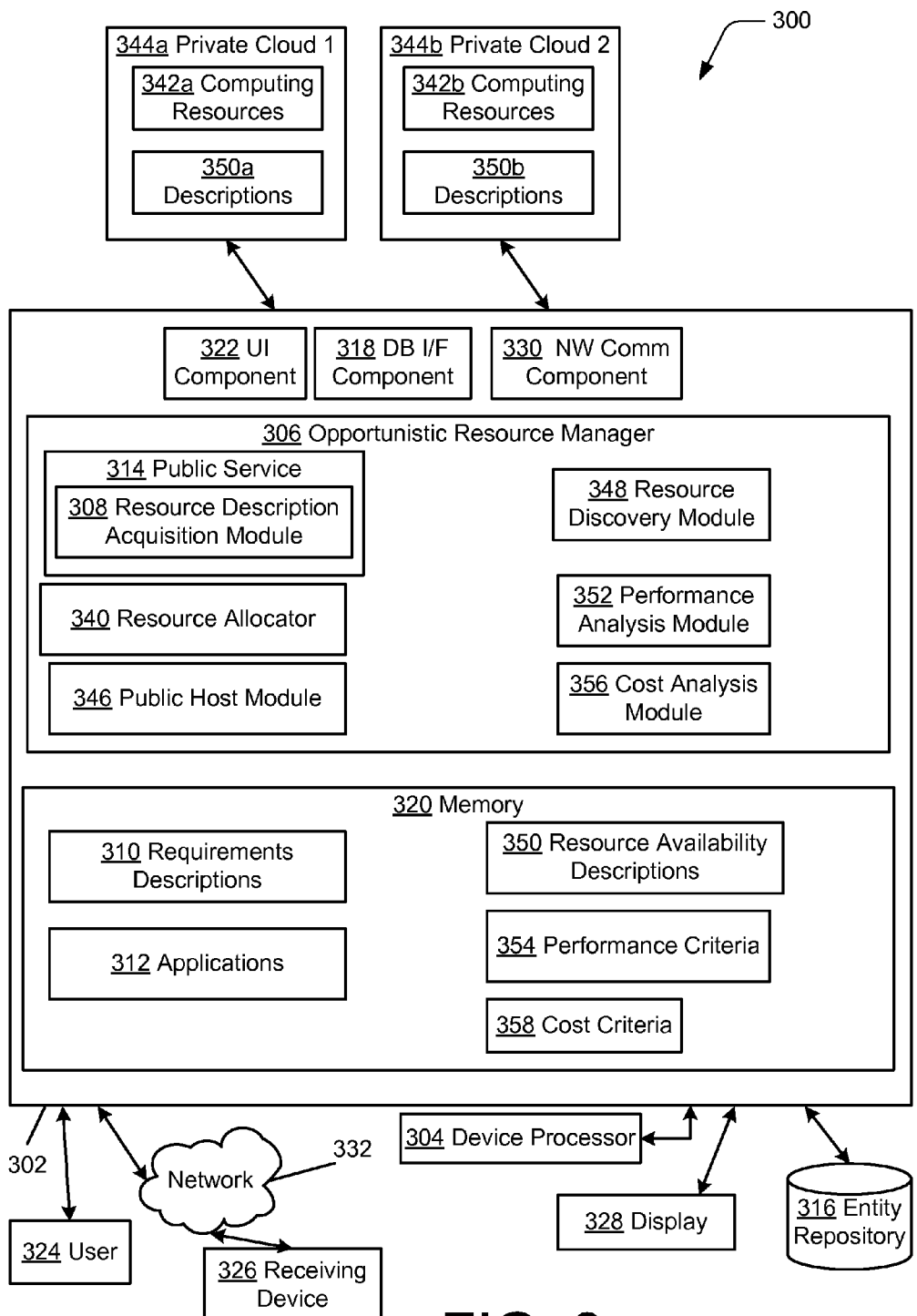
FIG. 3 is a block diagram illustrating an example generalized system for connecting private computational resources to external services.

As further discussed herein, FIG. 3 is a block diagram of a generalized system 300 for connecting private computational resources to external services. The generalized system 300 as shown is merely intended to illustrate various example functionality and/or logic that may be included in example techniques as discussed herein, and is not intended to be limiting in terms of implementations in various hardware and/or software configurations.

For example, the system 300 may include computer-readable storage medium storing instructions for execution by at least one processor. As shown in FIG. 3, the system 300 may include a device 302 that includes at least one processor 304. The device 302 may include an opportunistic resource manager 306 that may include a resource description acquisition module 308 that may obtain descriptions 310 of one or more computing resource requirements for execution of one or more applications 312 associated with a plurality of dynamically changing workloads. The resource description acquisition module 308 may be included in a publicly available service 314.

For example, the resource description acquisition module 308 may obtain a description 310 of one or more computing resource requirements for execution of an application 312 associated with the publicly available service 314.

According to an example embodiment, the opportunistic resource manager 306, or one or more portions thereof, may include executable instructions that may be stored on a tangible computer-readable storage medium, as discussed below. According to an example embodiment, the computer-readable storage medium may include any number of storage devices, and any number of storage media types, including distributed devices.

In this context, a "processor" may include a single processor or multiple processors configured to process instructions associated with a processing system. A processor may thus include one or more processors processing instructions in parallel and/or in a distributed manner. Although the device processor 304 is depicted as external to the opportunistic resource manager 306 in FIG. 3, one skilled in the art of data processing will appreciate that the device processor 304 may be implemented as a single component, and/or as distributed units which may be located internally or externally to the opportunistic resource manager 306, and/or any of its elements.

For example, the system 300 may include one or more processors 304. For example, the system 300 may include at least one tangible computer-readable storage medium storing instructions executable by the one or more processors 304, the executable instructions configured to cause at least one computing apparatus (e.g., a data processing apparatus) to perform operations associated with various example components included in the system 300, as discussed herein. For example, the one or more processors 304 may be included in the at least one computing apparatus. One skilled in the art of data processing will understand that there are many configurations of processors and computing apparatuses that may be configured in accordance with the discussion herein, without departing from the spirit of such discussion.

In this context, a "component" may refer to executable instructions or hardware that may be configured to perform certain operations, with hardware assistance. Such instructions may be included within component groups of instructions, or may be distributed over more than one group. For example, some instructions associated with operations of a first component may be included in a group of instructions associated with operations of a second component (or more components). For example, a "component" herein may refer to a type of computational entity configured with functionality that may be implemented by executable instructions that may be located in a single entity, or may be spread or distributed over multiple entities, and may overlap with instructions and/or hardware associated with other components. In this context, "executable" instructions refer to instructions that are specifically configured for execution by one or more hardware devices, and do not refer to software per se.

According to an example embodiment, the opportunistic resource manager 306 may be implemented in association with one or more user devices. For example, the opportunistic resource manager 306 may communicate with one or more servers, as discussed further below.

For example, an entity repository 316 may include one or more databases, and may be accessed via a database interface component 318. One skilled in the art of data processing will appreciate that there are many techniques for storing repository information discussed herein, such as various types of database configurations (e.g., relational databases, hierarchical databases, distributed databases) and non-database configurations.

According to an example embodiment, the opportunistic resource manager 306 may include a memory 320 that may, for example, store intermediate data for the opportunistic resource manager 306. In this context, a "memory" may include a single memory device or multiple memory devices configured to store data and/or instructions. Further, the memory 320 may span multiple distributed storage devices.

According to an example embodiment, a user interface component 322 may manage communications between a user 324 and the opportunistic resource manager 306. The user 324 may be associated with a receiving device 326 that may be associated with a display 328 and other input/output devices. For example, the display 328 may be configured to communicate with the receiving device 326, via internal device bus communications, or via at least one network connection.

According to example embodiments, the display 328 may be implemented as a flat screen display, a print form of display, a two-dimensional display, a three-dimensional display, a static display, a moving display, sensory displays such as tactile output, audio output, and any other form of output for communicating with a user (e.g., the user 324).

According to an example embodiment, the opportunistic resource manager 306 may include a network communication component 330 that may manage network communication between the opportunistic resource manager 306 and other entities that may communicate with the opportunistic resource manager 306 via at least one network 332. For example, the network 332 may include at least one of the Internet, at least one wireless network, or at least one wired network. For example, the network 332 may include a cellular network, a radio network, or any type of network that may support transmission of data for the opportunistic resource manager 306. For example, the network communication component 330 may manage network communications between the opportunistic resource manager 306 and the receiving device 326. For example, the network communication component 330 may manage network communication between the user interface component 322 and the receiving device 326.

A resource allocator 340 may opportunistically obtain access to computing resources 342a, 342b from one or more private clouds 344a, 344b that are external to, and separate from, the publicly available service 314, by matching the one or more computing resource requirements to temporarily available computing resources of the one or more private clouds 344a, 344b. While the resource allocator 340 is shown in FIG. 3 as internal to the opportunistic resource manager 306, it is to be understood that, as discussed above, the resource allocator 340 may be implemented in many forms, such as part of the resource allocator 340, or as a distributed application that is distributed over devices of the publicly available service 314 and one or more of the private clouds 344a, 344b. Further, while only two private clouds 344a, 344b are shown in FIG. 3 (for ease of illustration and discussion), it is to be understood that there may be one, or many more private clouds whose computing resources may be used by the system 300.

In this context, "opportunistically" refers to taking advantage of opportunities as they arise. For example, the resource allocator 340 obtains access to the computing resources 342a, 342b when they become available due to non-use (e.g., the computing resources 342a, 342b are currently idle, from the perspective of the private clouds 344a, 344b—although the computing resources 342a, 342b may be in use by the private clouds 344a, 344b at times other than a current time of "availability" to the resource allocator 340). In accordance with example techniques discussed herein, the private clouds 344a, 344b report the voluntary availability of their respective computing resources 342a, 342b to the system 300 over time (e.g., which may include reporting which of their respective computing resources 342a, 342b will be available, at what times, if they are not always available for use by the system 300).

A public host module 346 may initiate control of a hosting activity of execution of the one or more applications 312, using the matched temporarily available computing resources of the one or more private clouds 344a, 344b.

For example, a resource discovery module 348 may determine spare capacity computing resources that are available at the one or more private clouds 344a, 344b, based on resource availability descriptions 350 received from the one or more private clouds 344a, 344b.

For example, the resource allocator 340 may opportunistically obtain access to the computing resources 342a, 342b by selecting the temporarily available computing resources of the one or more private clouds 344a, 344b that satisfy at least a portion of the one or more computing resource requirements 310.

For example, the resource discovery module 348 may determine spare capacity computing resources that are available at the one or more private clouds, based on resource availability descriptions 350 received from the one or more private clouds 344a, 344b.

For example, a performance analysis module 352 may perform an analysis of performance criteria 354 of the spare capacity computing resources that are available at the one or more private clouds 344a, 344b.

For example, the resource allocator 340 may opportunistically obtain access to the computing resources 342a, 342b by selecting the temporarily available computing resources of the one or more private clouds 344a, 344b that satisfy at least a portion of the one or more computing resource requirements 310, and that provide optimized performance of execution of the one or more applications 312, based on the analysis of performance criteria 354.

For example, the performance criteria 354 of the spare capacity computing resources that are available at the one or more private clouds 344a, 344b may include one or more of time to initial response of the one or more private clouds 344a, 344b that include the selected temporarily available computing resources, average response time of the one or more private clouds 344a, 344b that include the selected temporarily available computing resources, over multiple requests, or reliability of the of the one or more private clouds 344a, 344b that include the selected temporarily available computing resources. For example, the average response time and/or the reliability values may be determined in accordance with performance of the private clouds 344a, 344b over time (e.g., historical data associated with the private clouds 344a, 344b), or may be determined based on resources currently available at the private clouds 344a, 344b, or as discussed further herein. One skilled in the art of data processing will understand that there may be many techniques for determining these values, without departing from the spirit of the discussion herein.

For example, the resource discovery module 348 may determine spare capacity computing resources that are available at the one or more private clouds 344a, 344b, based on resource availability descriptions 350 received from the one or more private clouds 344a, 344b.

For example, a cost analysis module 356 may perform an analysis of cost criteria 358 of the spare capacity computing resources that are available at the one or more private clouds 344a, 344b, and a cost of bandwidth for accessing the spare capacity computing resources.

For example, the resource allocator 340 may opportunistically obtain access to the computing resources 342a, 342b by selecting the temporarily available computing resources of the one or more private clouds 344a, 344b that satisfy at least a portion of the one or more computing resource requirements 310, and that provide optimized cost of execution of the one or more applications 312, based on the analysis of cost criteria 358.

For example, the resource allocator 340 may opportunistically obtain access to computing resources 342a, 342b from one or more private clouds 344a, 344b that are external to, and separate from, the publicly available service 314, by matching the one or more computing resource requirements 310 to temporarily available computing resources of the one or more private clouds 344a, 344b, based on one or more of a multi-criteria optimization technique, an automated auction, or a rule-based allocation technique.

For example, the resource allocator 340 may opportunistically obtain access to computing resources 342a, 342b from a plurality of private clouds 344a, 344b that are external to, and separate from, the publicly available service 314, by matching the one or more computing resource requirements 310 to temporarily available computing resources of the plurality of private clouds 344a, 344b, based on one or more of an integer linear programming technique, branch and bound heuristics, or a greedy optimization technique.

For example, linear programming refers to a solution of a mathematical problem concerning maximum and minimum values of a first-degree (linear) algebraic expression, with variables subject to particular stated conditions (restraints). An integer programming problem in which all variables are required to be integer is called a pure integer programming problem. For example, branch and bound refers to a general algorithm for finding optimal solutions of various optimization problems, especially in discrete and combinatorial optimization. A branch-and-bound algorithm may include a systematic enumeration of all candidate solutions, where large subsets of fruitless candidates are discarded en masse, by using upper and lower estimated bounds of the quantity being optimized.

For example, a greedy algorithm may follow a problem solving heuristic of making a locally optimal choice at each stage with a goal of determining a global optimum. For example, a greedy strategy may not generally produce an optimal solution, but nonetheless a greedy heuristic may yield locally optimal solutions that approximate a global optimal solution in a reasonable time.

For example, a mediated auction may involve a buyer (e.g., the public cloud or the client) and a seller (e.g., the private cloud with resources to offer), and a mediator to mediate transactions between buyers and sellers (e.g., via offers, bidding, etc.).

For example, the resource discovery module 348 may determine spare capacity computing resources that are dynamically available at the one or more private clouds 344a, 344b, based on resource availability descriptions 350 that are dynamically received from the one or more private clouds 344a, 344b over time. For example, the resource allocator 340 may dynamically obtain access to the computing resources 342a, 342b by dynamically selecting the temporarily available computing resources of the one or more private clouds 344a, 344b that satisfy at least a portion of the one or more computing resource requirements 310, as the computing resources become available over time, and dynamically release previous computing resources for which access was previously obtained, if the previous computing resources become unavailable.

For example, the resource availability descriptions 350 that are dynamically received from the one or more private clouds 344a, 344b over time may include resource availability for time slots of predetermined temporal intervals. For example, the resource allocator 340 may dynamically obtain access to the computing resources 342a, 342b by dynamically selecting the temporarily available computing resources of the one or more private clouds 344a, 344b that satisfy at least a portion of the one or more computing resource requirements 310, based on the resource availability descriptions 350, as the computing resources become available over time, and dynamically release previous computing resources for which access was previously obtained, if the previous computing resources become unavailable.

For example, the resource discovery module 348 may determine, for each of the time slots, a list of spare capacity computing resources that are dynamically available at the one or more private clouds 344a, 344b, based on resource availability descriptions 350 that are dynamically received from the one or more private clouds over time. For example, the resource description acquisition module 308 may determine, for each of the time slots, a list of cost constraints and performance constraints associated with the respective descriptions of the one or more computing resource requirements for execution of the one or more applications 312. For example, the resource allocator 340 may dynamically optimize allocation access to the computing resources 342a, 342b over time.

For example, the resource allocator 340 may dynamically optimize allocation access to the computing resources 342a, 342b over time, based on one or more of a dynamic optimization technique, a Viterbi Algorithm technique, or a multi-slot optimization technique.

For example, the resource allocator 340 may opportunistically obtain access to computing resources 342a, 342b from a computing entity that includes at least one private computing device 344a, 344b that is external to, and separate from, the publicly available service 314, by intelligently matching the one or more computing resource requirements 310 to available computing resources of the computing entity that includes the at least one private computing device with private computing resources that are temporarily available from a private computing device source, the intelligently matching performed using a performance optimization analysis. For example the performance analysis module 352 may perform the performance optimization analysis.

For example, the performance optimization analysis may include a prediction analysis of execution performance of the application 312 associated with the publicly available service 314, based on the obtained description 310 of one or more computing resource requirements, and on the description 350 of the available computing resources of the computing entity.

For example, the performance optimization analysis may include an analysis of one or more of compute throughput, network latency, network bandwidth, or storage performance.

For example, the computing entity may include at least one private computing device in at least one private cloud.

For example, the computing entity may include a plurality of computing devices in at least one private cloud and at least one public cloud.

As another example, the resource description acquisition module 308 may obtain a description 310 of one or more computing resource requirements for execution of an application 312.

For example, the description 310 of the one or more computing resource requirements may be provided to the resource allocator 340 of a publicly available service 314, the resource allocator 340 configured to opportunistically obtain access to computing resources 342a, 342b from a computing entity that includes at least one private computing device 344a, 344b that is external to, and separate from, the publicly available service 314, by intelligently matching the one or more computing resource requirements 310 to available computing resources of the computing entity that includes the at least one private computing device.

For example, the public host module 346 may initiate control of a hosting activity of execution of the application 312 for one or more users, using the matched available computing resources of the computing entity.

For example, the resource allocator 340 may be hosted at a public cloud associated with the publicly available service 314.

For example, the resource allocator 340 may be hosted at a server that is separate from a public cloud that hosts the publicly available service 314.

For example, the resource allocator 340 may be hosted as a distributed resource allocation application that is hosted at a public cloud associated with the publicly available service 314, and at a plurality of private clouds.

One skilled in the art of data processing will appreciate that many different techniques may be used for intelligently allocating computational resources that are available on private clouds (or private devices) to execute applications from sources external to the private clouds, without departing from the spirit of the discussion herein.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 4A:
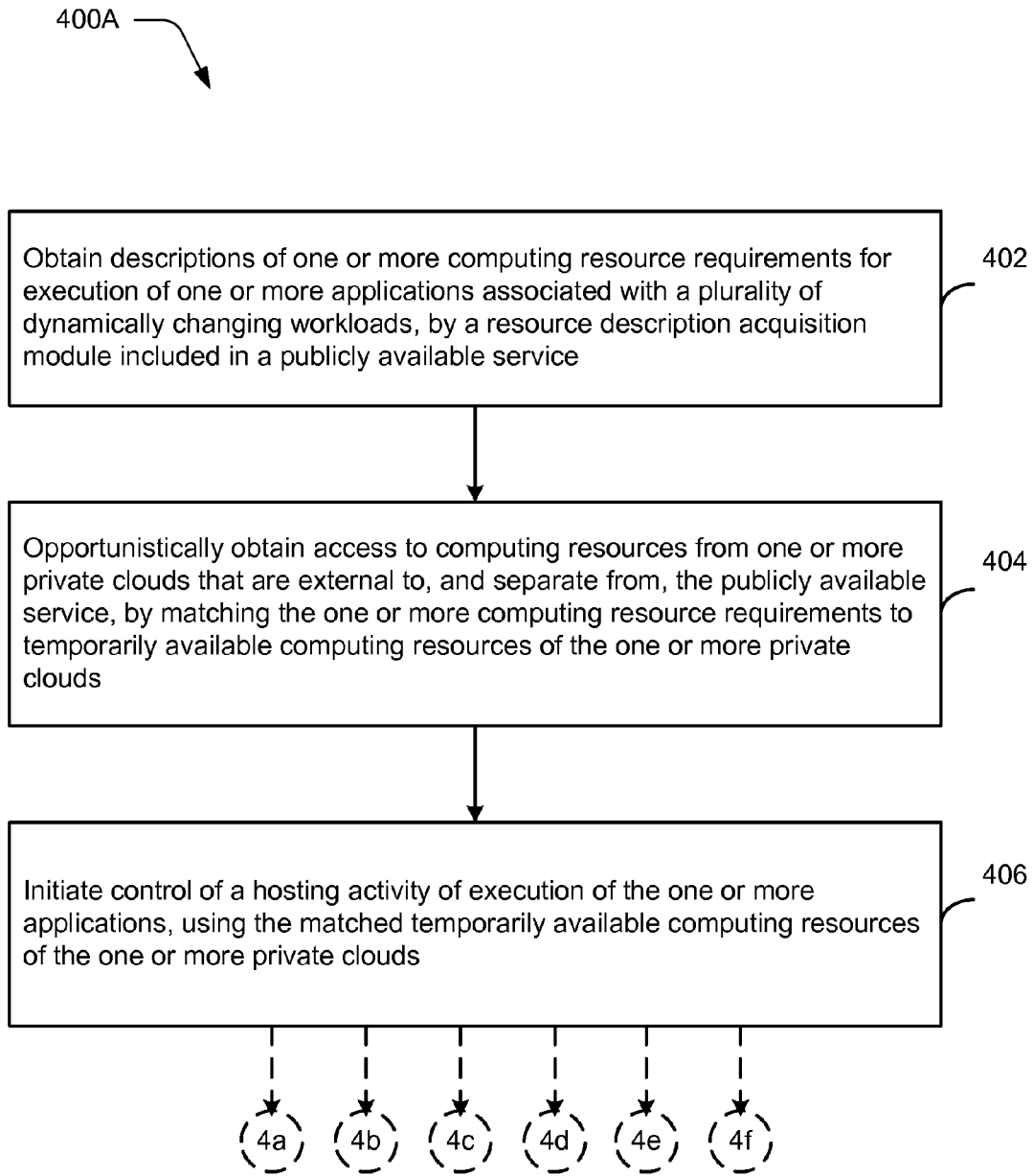
FIGS. 4A-4E are a flowchart illustrating example operations of the system of FIG. 3.

FIGS. 4A-4E are a flowchart illustrating example operations of the system of FIG. 3, according to example embodiments. In the example of FIG. 4A, descriptions of one or more computing resource requirements for execution of one or more applications associated with a plurality of dynamically changing workloads are obtained, by a resource description acquisition module included in a publicly available service (402).

Access to computing resources is opportunistically obtained from one or more private clouds that are external to, and separate from, the publicly available service, by matching the one or more computing resource requirements to temporarily available computing resources of the one or more private clouds (404).

Control of a hosting activity of execution of the one or more applications is initiated, using the matched temporarily available computing resources of the one or more private clouds (406).

Figure 4B:
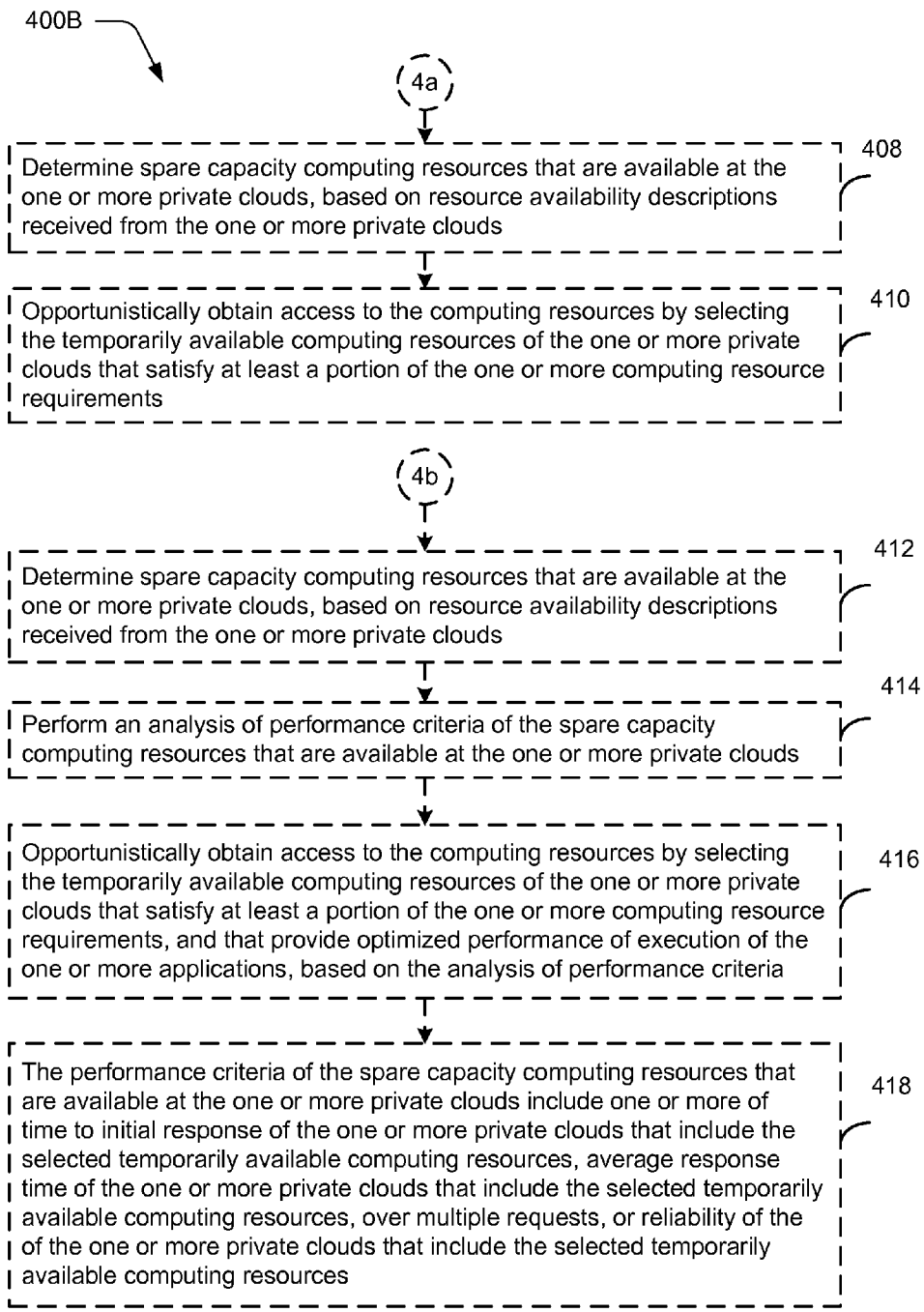

For example, spare capacity computing resources that are available at the one or more private clouds may be determined, based on resource availability descriptions received from the one or more private clouds (408), in the example of FIG. 4B.

For example, access to the computing resources may be opportunistically obtained by selecting the temporarily available computing resources of the one or more private clouds that satisfy at least a portion of the one or more computing resource requirements (410).

For example, spare capacity computing resources that are available at the one or more private clouds may be determined, based on resource availability descriptions received from the one or more private clouds (412).

For example, an analysis of performance criteria of the spare capacity computing resources that are available at the one or more private clouds may be performed (414).

For example, access to the computing resources may be opportunistically obtained by selecting the temporarily available computing resources of the one or more private clouds that satisfy at least a portion of the one or more computing resource requirements, and that provide optimized performance of execution of the one or more applications, based on the analysis of performance criteria (416).

For example, the performance criteria of the spare capacity computing resources that are available at the one or more private clouds may include one or more of time to initial response of the one or more private clouds that include the selected temporarily available computing resources, average response time of the one or more private clouds that include the selected temporarily available computing resources, over multiple requests, or reliability of the of the one or more private clouds that include the selected temporarily available computing resources (418).

Figure 4C:
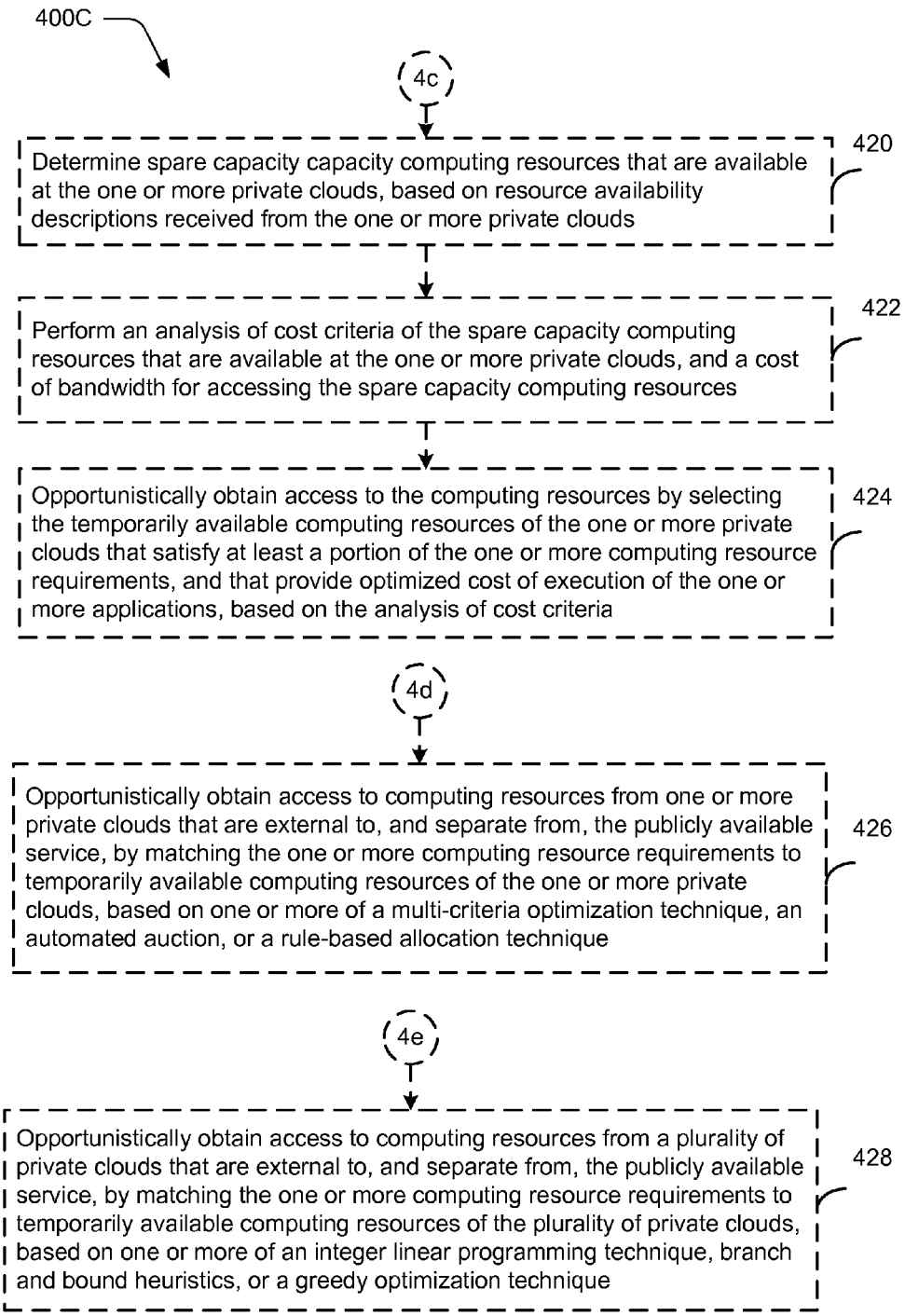

For example, spare capacity computing resources that are available at the one or more private clouds may be determined, based on resource availability descriptions received from the one or more private clouds (420), in the example of FIG. 4C.

For example, an analysis of cost criteria of the spare capacity computing resources that are available at the one or more private clouds, and a cost of bandwidth for accessing the spare capacity computing resources may be performed (422).

For example, access to the computing resources may be opportunistically obtained by selecting the temporarily available computing resources of the one or more private clouds that satisfy at least a portion of the one or more computing resource requirements, and that provide optimized cost of execution of the one or more applications, based on the analysis of cost criteria (424).

For example, access to computing resources from one or more private clouds that are external to, and separate from, the publicly available service, may be opportunistically obtained by matching the one or more computing resource requirements to temporarily available computing resources of the one or more private clouds, based on one or more of a multi-criteria optimization technique, an automated auction, or a rule-based allocation technique (426).

For example, access to computing resources from a plurality of private clouds that are external to, and separate from, the publicly available service, may be opportunistically obtained by matching the one or more computing resource requirements to temporarily available computing resources of the plurality of private clouds, based on one or more of an integer linear programming technique, branch and bound heuristics, or a greedy optimization technique (428).

Figure 4D:
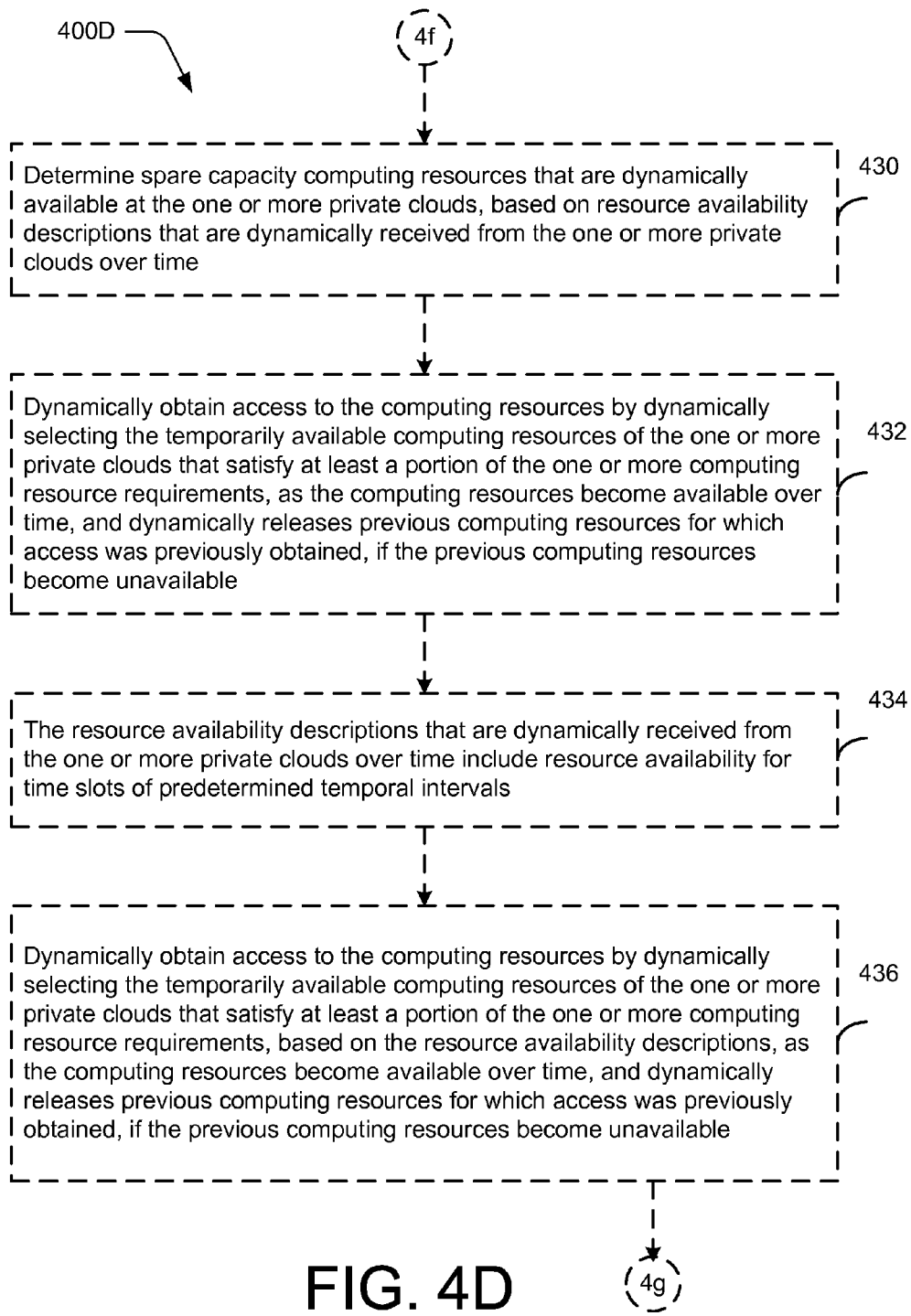

For example, spare capacity computing resources that are dynamically available at the one or more private clouds may be determined, based on resource availability descriptions that are dynamically received from the one or more private clouds over time (430), in the example of FIG. 4D.

For example, access to the computing resources may be dynamically obtained by dynamically selecting the temporarily available computing resources of the one or more private clouds that satisfy at least a portion of the one or more computing resource requirements, as the computing resources become available over time, and dynamically releases previous computing resources for which access was previously obtained, if the previous computing resources become unavailable (432).

For example, the resource availability descriptions that are dynamically received from the one or more private clouds over time may include resource availability for time slots of predetermined temporal intervals (434).

For example, access to the computing resources may be dynamically obtained by dynamically selecting the temporarily available computing resources of the one or more private clouds that satisfy at least a portion of the one or more computing resource requirements, based on the resource availability descriptions, as the computing resources become available over time, and dynamically releases previous computing resources for which access was previously obtained, if the previous computing resources become unavailable (436).

Figure 4E:
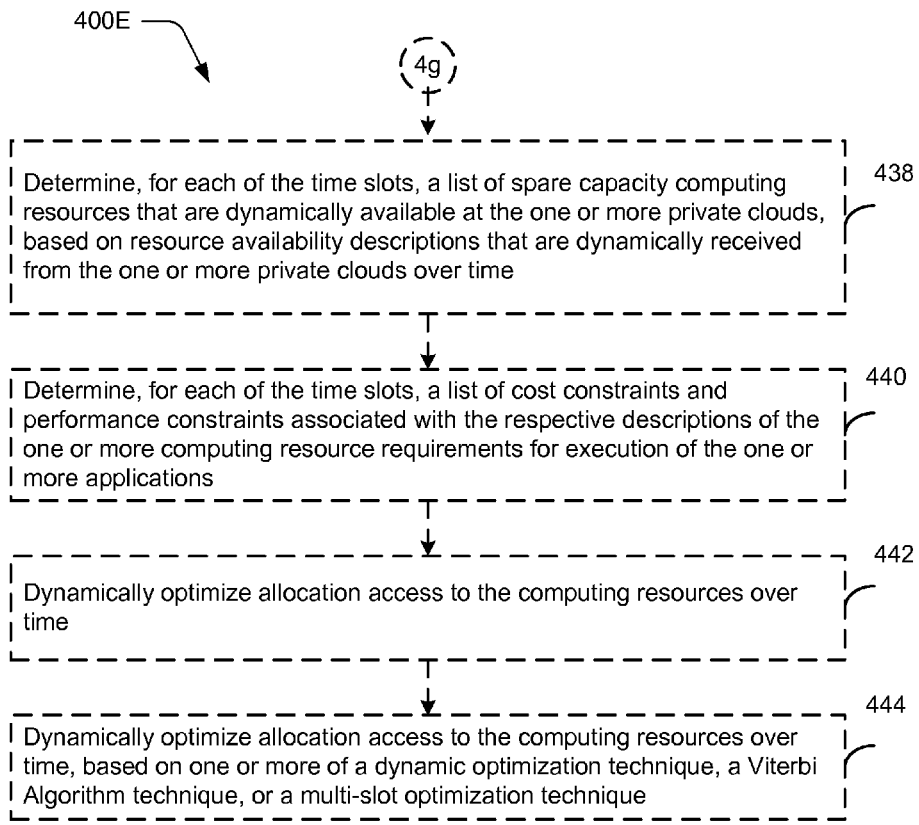

For example, for each of the time slots, a list of spare capacity computing resources that are dynamically available at the one or more private clouds may be determined, based on resource availability descriptions that are dynamically received from the one or more private clouds over time (438), in the example of FIG. 4E.

For example, for each of the time slots, a list of cost constraints and performance constraints associated with the respective descriptions of the one or more computing resource requirements for execution of the one or more applications, may be determined (440).

For example, allocation access to the computing resources may be dynamically optimized over time (442). For example, access to the computing resources may be dynamically optimized over time, based on one or more of a dynamic optimization technique, a Viterbi Algorithm technique, or a multi-slot optimization technique (444). For example, the resource allocator 114 may dynamically optimize allocation access to the computing resources over time, based on one or more of a dynamic optimization technique, a Viterbi Algorithm technique, or a multi-slot optimization technique.

Figure 5A:
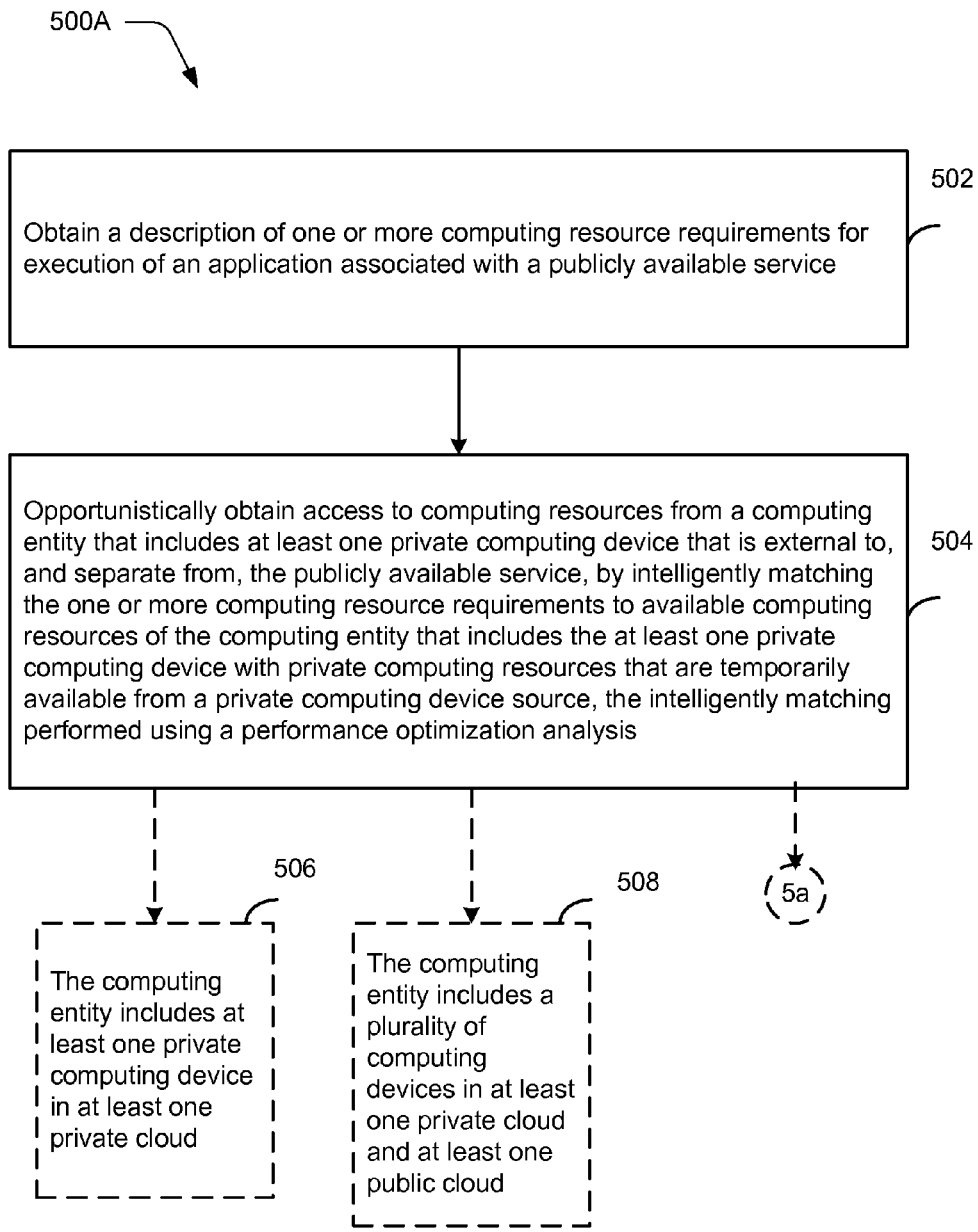
FIGS. 5A-5B are a flowchart illustrating example operations of the system of FIG. 3.
Figure 5B:
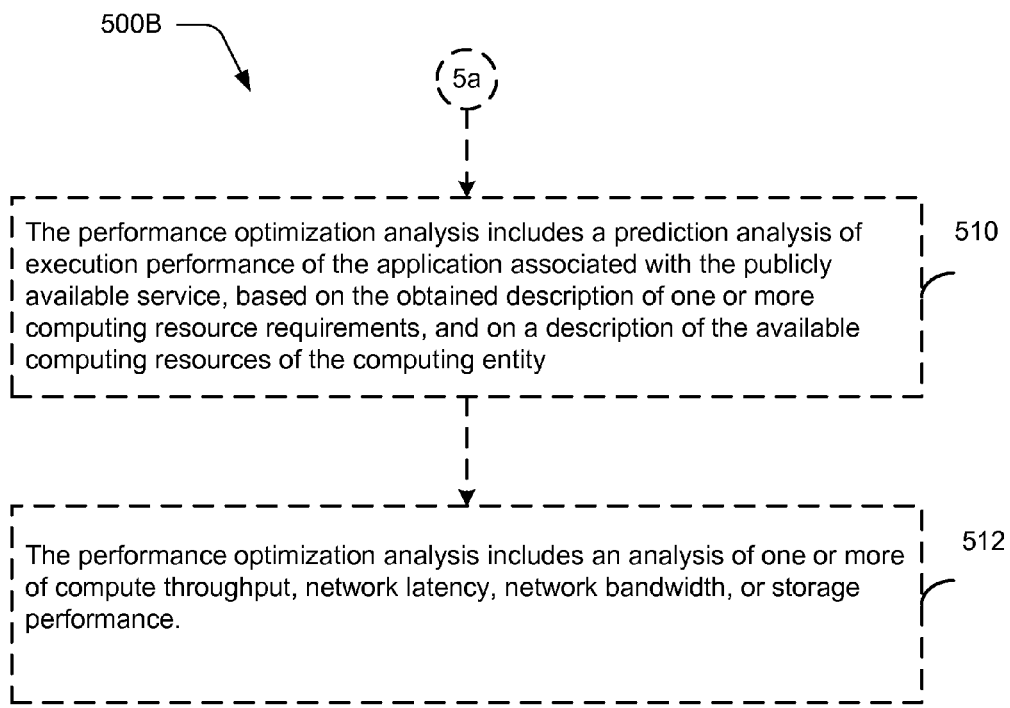

FIGS. 5A-5B are a flowchart illustrating example operations of the system of FIG. 3, according to example embodiments. In the example of FIG. 5A, a description of one or more computing resource requirements for execution of an application associated with a publicly available service is obtained (502). Access to computing resources is opportunistically obtained from a computing entity that includes at least one private computing device that is external to, and separate from, the publicly available service, by intelligently matching the one or more computing resource requirements to available computing resources of the computing entity that includes the at least one private computing device with private computing resources that are temporarily available from a private computing device source (504). The intelligently matching is performed using a performance optimization analysis.

For example, the computing entity may include at least one private computing device in at least one private cloud (506).

For example, the computing entity may include a plurality of computing devices in at least one private cloud and at least one public cloud (508).

For example, the performance optimization analysis may include a prediction analysis of execution performance of the application associated with the publicly available service, based on the obtained description of one or more computing resource requirements, and on a description of the available computing resources of the computing entity (510), as indicated in FIG. 5B.

For example, the performance optimization analysis includes an analysis of one or more of compute throughput, network latency, network bandwidth, or storage performance (512).

Figure 6:
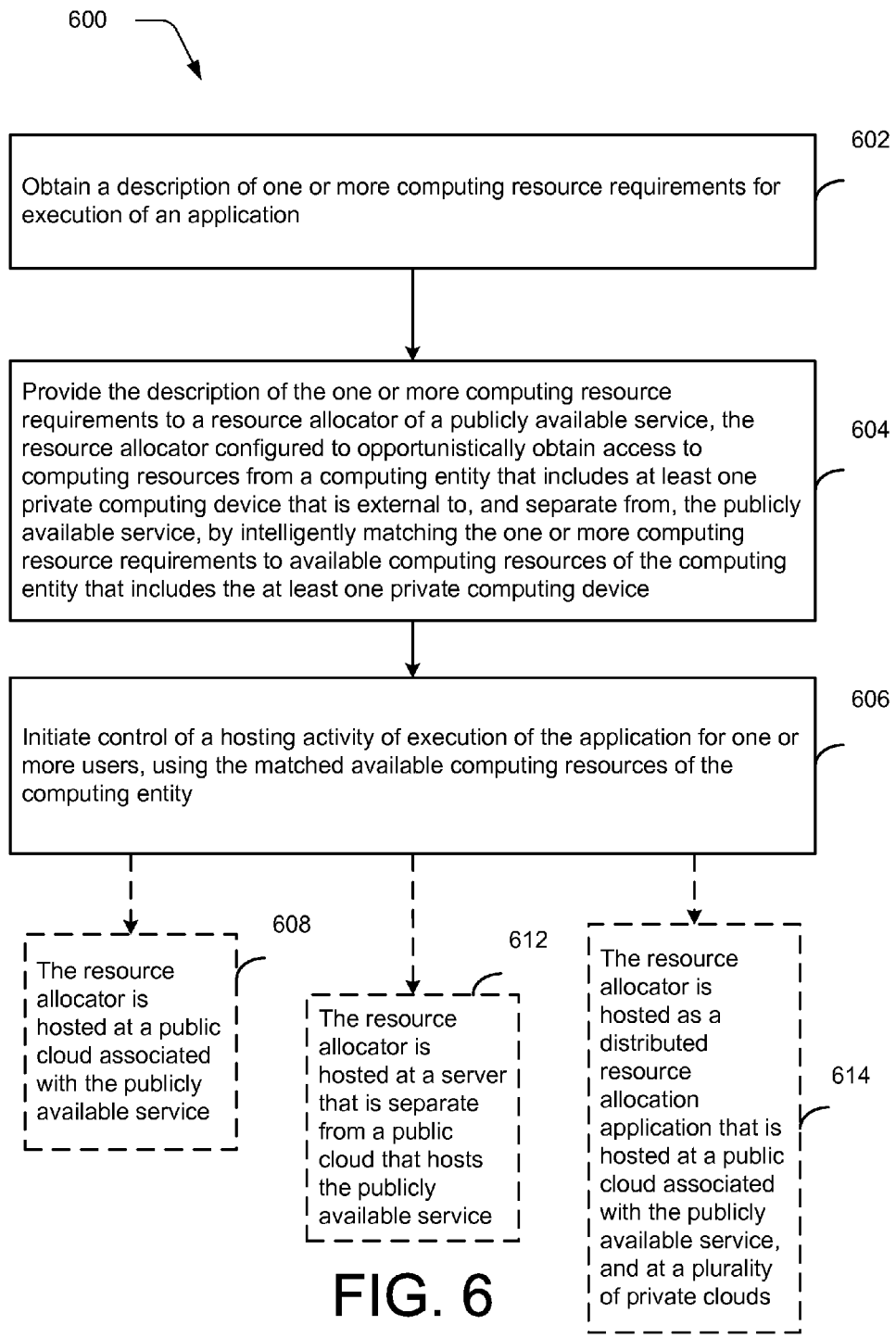
FIG. 6 is a flowchart illustrating example operations of the system of FIG. 3.

FIG. 6 is a flowchart illustrating example operations of the system of FIG. 3, according to example embodiments. In the example of FIG. 6, a description of one or more computing resource requirements for execution of an application is obtained (602).

The description of the one or more computing resource requirements is provided to a resource allocator of a publicly available service, the resource allocator configured to opportunistically obtain access to computing resources from a computing entity that includes at least one private computing device that is external to, and separate from, the publicly available service, by intelligently matching the one or more computing resource requirements to available computing resources of the computing entity that includes the at least one private computing device (604).

Control of a hosting activity of execution of the application is initiated for one or more users, using the matched available computing resources of the computing entity (606).

For example, the resource allocator may be hosted at a public cloud associated with the publicly available service (608).

For example, the resource allocator may be hosted at a server that is separate from a public cloud that hosts the publicly available service (610).

For example, the resource allocator may be hosted as a distributed resource allocation application that is hosted at a public cloud associated with the publicly available service, and at a plurality of private clouds (612).

IV. Aspects of Certain Embodiments

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

A data processing apparatus includes a computer-readable storage medium storing executable instructions that cause the data processing apparatus to obtain a description of one or more computing resource requirements for execution of an application associated with a publicly available service, and opportunistically obtain access to computing resources from a computing entity that includes at least one private computing device that is external to, and separate from, the publicly available service, by intelligently matching the one or more computing resource requirements to available computing resources of the computing entity that includes the at least one private computing device with private computing resources that are temporarily available from a private computing device source, the intelligently matching performed using a performance optimization analysis.

The performance optimization analysis includes a prediction analysis of execution performance of the application associated with the publicly available service, based on the obtained description of one or more computing resource requirements, and on a description of the available computing resources of the computing entity.

The performance optimization analysis includes an analysis of one or more of compute throughput, network latency, network bandwidth, or storage performance.

The computing entity includes at least one private computing device in at least one private cloud.

The computing entity includes a plurality of computing devices in at least one private cloud and at least one public cloud.

A system comprises at least one processor, and at least one computer-readable storage medium that stores executable code that is executable by the at least one processor, the executable code including an opportunistic resource manager. The opportunistic resource manager includes a resource description acquisition module that obtains descriptions of one or more computing resource requirements for execution of one or more applications associated with a plurality of dynamically changing workloads, the resource description acquisition module included in a publicly available service. The opportunistic resource manager includes a resource allocator that opportunistically obtains, via the at least one device processor, access to computing resources from one or more private clouds that are external to, and separate from, the publicly available service, by matching the one or more computing resource requirements to temporarily available computing resources of the one or more private clouds. The opportunistic resource manager includes a public host module that initiates control of a hosting activity of execution of the one or more applications, using the matched temporarily available computing resources of the one or more private clouds.

The system further comprises a resource discovery module that determines spare capacity computing resources that are available at the one or more private clouds, based on resource availability descriptions received from the one or more private clouds, wherein the resource allocator opportunistically obtains access to the computing resources by selecting the temporarily available computing resources of the one or more private clouds that satisfy at least a portion of the one or more computing resource requirements.

The system further comprises a resource discovery module that determines spare capacity computing resources that are available at the one or more private clouds, based on resource availability descriptions received from the one or more private clouds. The system further comprises a performance analysis module that performs an analysis of performance criteria of the spare capacity computing resources that are available at the one or more private clouds, wherein the resource allocator opportunistically obtains access to the computing resources by selecting the temporarily available computing resources of the one or more private clouds that satisfy at least a portion of the one or more computing resource requirements, and that provide optimized performance of execution of the one or more applications, based on the analysis of performance criteria.

The performance criteria of the spare capacity computing resources that are available at the one or more private clouds include one or more of time to initial response of the one or more private clouds that include the selected temporarily available computing resources, average response time of the one or more private clouds that include the selected temporarily available computing resources, over multiple requests, or reliability of the of the one or more private clouds that include the selected temporarily available computing resources.

The system further comprises a resource discovery module that determines spare capacity computing resources that are available at the one or more private clouds, based on resource availability descriptions received from the one or more private clouds, and a cost analysis module that performs an analysis of cost criteria of the spare capacity computing resources that are available at the one or more private clouds, and a cost of bandwidth for accessing the spare capacity computing resources, wherein the resource allocator opportunistically obtains access to the computing resources by selecting the temporarily available computing resources of the one or more private clouds that satisfy at least a portion of the one or more computing resource requirements, and that provide optimized cost of execution of the one or more applications, based on the analysis of cost criteria.

The resource allocator opportunistically obtains access to computing resources from one or more private clouds that are external to, and separate from, the publicly available service, by matching the one or more computing resource requirements to temporarily available computing resources of the one or more private clouds, based on one or more of a multi-criteria optimization technique, an automated auction, or a rule-based allocation technique.

The resource allocator opportunistically obtains access to computing resources from a plurality of private clouds that are external to, and separate from, the publicly available service, by matching the one or more computing resource requirements to temporarily available computing resources of the plurality of private clouds, based on one or more of an integer linear programming technique, branch and bound heuristics, or a greedy optimization technique.

The system further comprises a resource discovery module that determines spare capacity computing resources that are dynamically available at the one or more private clouds, based on resource availability descriptions that are dynamically received from the one or more private clouds over time, wherein the resource allocator dynamically obtains access to the computing resources by dynamically selecting the temporarily available computing resources of the one or more private clouds that satisfy at least a portion of the one or more computing resource requirements, as the computing resources become available over time, and dynamically releases previous computing resources for which access was previously obtained, if the previous computing resources become unavailable.

The resource availability descriptions that are dynamically received from the one or more private clouds over time include resource availability for time slots of predetermined temporal intervals, wherein the resource allocator dynamically obtains access to the computing resources by dynamically selecting the temporarily available computing resources of the one or more private clouds that satisfy at least a portion of the one or more computing resource requirements, based on the resource availability descriptions, as the computing resources become available over time, and dynamically releases previous computing resources for which access was previously obtained, if the previous computing resources become unavailable.

The resource discovery module determines, for each of the time slots, a list of spare capacity computing resources that are dynamically available at the one or more private clouds, based on resource availability descriptions that are dynamically received from the one or more private clouds over time. The resource description acquisition module determines, for each of the time slots, a list of cost constraints and performance constraints associated with the respective descriptions of the one or more computing resource requirements for execution of the one or more applications. The resource allocator dynamically optimizes allocation access to the computing resources over time.

The resource allocator dynamically optimizes allocation access to the computing resources over time, based on one or more of a dynamic optimization technique, a Viterbi Algorithm technique, or a multi-slot optimization technique.

A computer program product comprises a computer-readable storage medium storing executable code that causes at least one data processing apparatus to obtain a description of one or more computing resource requirements for execution of an application, provide the description of the one or more computing resource requirements to a resource allocator of a publicly available service, the resource allocator configured to opportunistically obtain access to computing resources from a computing entity that includes at least one private computing device that is external to, and separate from, the publicly available service, by intelligently matching the one or more computing resource requirements to available computing resources of the computing entity that includes the at least one private computing device, and initiate control of a hosting activity of execution of the application for one or more users, using the matched available computing resources of the computing entity.

The resource allocator is hosted at a public cloud associated with the publicly available service.

The resource allocator is hosted at a server that is separate from a public cloud that hosts the publicly available service.

The resource allocator is hosted as a distributed resource allocation application that is hosted at a public cloud associated with the publicly available service, and at a plurality of private clouds.

A method includes obtaining descriptions of one or more computing resource requirements for execution of one or more applications associated with a plurality of dynamically changing workloads, by a resource description acquisition module included in a publicly available service.

The method includes opportunistically obtaining access to computing resources from one or more private clouds that are external to, and separate from, the publicly available service, by matching the one or more computing resource requirements to temporarily available computing resources of the one or more private clouds.

The method includes initiating control of a hosting activity of execution of the one or more applications, using the matched temporarily available computing resources of the one or more private clouds.

The method includes determining spare capacity computing resources that are available at the one or more private clouds, based on resource availability descriptions received from the one or more private clouds.

The method includes opportunistically obtaining access to the computing resources by selecting the temporarily available computing resources of the one or more private clouds that satisfy at least a portion of the one or more computing resource requirements.

The method includes determining spare capacity computing resources that are available at the one or more private clouds, based on resource availability descriptions received from the one or more private clouds.

The method includes performing an analysis of performance criteria of the spare capacity computing resources that are available at the one or more private clouds.

The method includes opportunistically obtaining access to the computing resources by selecting the temporarily available computing resources of the one or more private clouds that satisfy at least a portion of the one or more computing resource requirements, and that provide optimized performance of execution of the one or more applications, based on the analysis of performance criteria.

The performance criteria of the spare capacity computing resources that are available at the one or more private clouds includes one or more of time to initial response of the one or more private clouds that include the selected temporarily available computing resources, average response time of the one or more private clouds that include the selected temporarily available computing resources, over multiple requests, or reliability of the of the one or more private clouds that include the selected temporarily available computing resources.

The method includes determining spare capacity computing resources that are available at the one or more private clouds, based on resource availability descriptions received from the one or more private clouds.

The method includes performing an analysis of cost criteria of the spare capacity computing resources that are available at the one or more private clouds, and a cost of bandwidth for accessing the spare capacity computing resources.

The method includes opportunistically obtaining access to the computing resources by selecting the temporarily available computing resources of the one or more private clouds that satisfy at least a portion of the one or more computing resource requirements, and that provide optimized cost of execution of the one or more applications, based on the analysis of cost criteria.

The method includes opportunistically obtaining access to computing resources from one or more private clouds that are external to, and separate from, the publicly available service, by matching the one or more computing resource requirements to temporarily available computing resources of the one or more private clouds, based on one or more of a multi-criteria optimization technique, an automated auction, or a rule-based allocation technique.

The method includes opportunistically obtaining access to computing resources from a plurality of private clouds that are external to, and separate from, the publicly available service, by matching the one or more computing resource requirements to temporarily available computing resources of the plurality of private clouds, based on one or more of an integer linear programming technique, branch and bound heuristics, or a greedy optimization technique.

The method includes determining spare capacity computing resources that are dynamically available at the one or more private clouds, based on resource availability descriptions that are dynamically received from the one or more private clouds over time.

The method includes dynamically obtaining access to the computing resources by dynamically selecting the temporarily available computing resources of the one or more private clouds that satisfy at least a portion of the one or more computing resource requirements, as the computing resources become available over time, and dynamically releases previous computing resources for which access was previously obtained, if the previous computing resources become unavailable.

The resource availability descriptions that are dynamically received from the one or more private clouds over time include resource availability for time slots of predetermined temporal intervals.

The method includes dynamically obtaining access to the computing resources by dynamically selecting the temporarily available computing resources of the one or more private clouds that satisfy at least a portion of the one or more computing resource requirements, based on the resource availability descriptions, as the computing resources become available over time, and dynamically releasing previous computing resources for which access was previously obtained, if the previous computing resources become unavailable.

The method includes determining, for each of the time slots, a list of spare capacity computing resources that are dynamically available at the one or more private clouds, based on resource availability descriptions that are dynamically received from the one or more private clouds over time.

The method includes determining, for each of the time slots, a list of cost constraints and performance constraints associated with the respective descriptions of the one or more computing resource requirements for execution of the one or more applications.

The method includes dynamically optimizing access to the computing resources over time.

The method includes dynamically optimizing access to the computing resources over time, based on one or more of a dynamic optimization technique, a Viterbi Algorithm technique, or a multi-slot optimization technique.

The method includes dynamically optimizing allocation access to the computing resources over time, via resource allocator, based on one or more of a dynamic optimization technique, a Viterbi Algorithm technique, or a multi-slot optimization technique.

A method includes obtaining a description of one or more computing resource requirements for execution of an application associated with a publicly available service.

The method includes opportunistically obtaining access to computing resources from a computing entity that includes at least one private computing device that is external to, and separate from, the publicly available service, by intelligently matching the one or more computing resource requirements to available computing resources of the computing entity that includes the at least one private computing device with private computing resources that are temporarily available from a private computing device source, the intelligently matching performed using a performance optimization analysis.

The performance optimization analysis includes a prediction analysis of execution performance of the application associated with the publicly available service, based on the obtained description of one or more computing resource requirements, and on a description of the available computing resources of the computing entity.

The performance optimization analysis includes an analysis of one or more of compute throughput, network latency, network bandwidth, or storage performance.

The computing entity includes at least one private computing device in at least one private cloud.

The computing entity includes a plurality of computing devices in at least one private cloud and at least one public cloud.

A method includes obtaining a description of one or more computing resource requirements for execution of an application.

The method includes providing the description of the one or more computing resource requirements to a resource allocator of a publicly available service, the resource allocator configured to opportunistically obtain access to computing resources from a computing entity that includes at least one private computing device that is external to, and separate from, the publicly available service, by intelligently matching the one or more computing resource requirements to available computing resources of the computing entity that includes the at least one private computing device.

The method includes initiating control of a hosting activity of execution of the application for one or more users, using the matched available computing resources of the computing entity.

The resource allocator is hosted at a public cloud associated with the publicly available service.

The resource allocator is hosted at a server that is separate from a public cloud that hosts the publicly available service.

The resource allocator is hosted as a distributed resource allocation application that is hosted at a public cloud associated with the publicly available service, and at a plurality of private clouds.

One skilled in the art of data processing will understand that there may be many ways of intelligently allocating computational resources that are available on private clouds (or private devices) to execute applications from sources external to the private clouds, without departing from the spirit of the discussion herein.

Customer privacy and confidentiality have been ongoing considerations in data processing environments for many years. Thus, example techniques for obtaining such computing resources may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Further, virtualization and encryption may be used to ensure that the private information of customers of the public service may be protected from owners of donating owners of private clouds.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in signals (e.g., a pure signal such as a pure propagated signal). Such implementations will be referred to herein as implemented via a "computer-readable transmission medium," which does not qualify herein as a "computer-readable storage medium" or a "computer-readable storage device" as discussed below.

Alternatively, implementations may be implemented via a computer program embodied in a machine usable or machine-readable storage device (e.g., a magnetic or digital medium such as a Universal Serial Bus (USB) storage device, a tape, hard disk drive, compact disk, digital video disk (DVD), etc.), for execution by, or to control the operation of, a computing apparatus (e.g., a data processing apparatus), e.g., a programmable processor, a special-purpose processor or device, a computer, or multiple computers.

Such implementations may be referred to herein as implemented via a "computer-readable storage medium" or a "computer-readable storage device" and are thus different from implementations that are purely signals such as pure propagated signals (and thus do not qualify herein as a "computer-readable transmission medium" as discussed above). Thus, as used herein, a reference to a "computer-readable storage medium" or a "computer-readable storage device" specifically excludes implementations as pure signals (e.g., propagated signals) per se.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Application-specific Integrated Circuits (ASICs), Application-specific Standard Products (ASSPs), Application-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, hover, gestures, and machine intelligence. Example NUI technologies may include, but are not limited to, touch sensitive displays, voice and speech recognition, intention and goal understanding, motion gesture detection using depth cameras (e.g., stereoscopic or time-of-flight camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a data processing apparatus that includes a computer-readable storage medium storing executable instructions that cause the data processing apparatus to:
obtain a description of one or more computing resource requirements for execution of an application associated with a publicly available service;
determine respective amounts of time involved for different private computing devices to obtain software to run the application, the different private computing devices being external to, and separate from, the publicly available service;
considering the respective amounts of time involved for the different private computing devices to obtain the software to run the application, match the one or more computing resource requirements to temporarily available computing resources of a selected private computing device to run the software; and
cause the selected private computing device to obtain the software and host the application.

2. The system of claim 1, wherein the executable instructions cause the data processing apparatus to:
perform a prediction analysis of execution performance of the application associated with the publicly available service, based at least on the obtained description of the one or more computing resource requirements, and on another description of the temporarily available computing resources of the selected private computing device.

3. The system of claim 2, wherein:
the prediction analysis includes an analysis of one or more of:
compute throughput, network latency, network bandwidth, or storage performance of the different private computing devices.

4. The system of claim 1, wherein the executable instructions cause the data processing apparatus to:
based at least on the respective amounts of time involved for the different private computing devices to obtain the software to run the application, determine respective first response times for the different private computing devices to respond to a first request from a client; and
identify the selected private computing device from among the different private computing devices to host the application based at least on the respective first response times.

5. The system of claim 4, wherein the executable instructions cause the data processing apparatus to:
consider other computing devices in at least one public cloud when identifying the selected private computing device to host the application.

6. A system comprising:
at least one processor;
at least one computer-readable storage medium that stores executable code that is executable by the at least one processor, the executable code causing the at least one processor to:
obtain descriptions of one or more computing resource requirements for execution of one or more applications associated with a plurality of dynamically changing workloads, the one or more applications being provided by a publicly available service;
identify one or more private clouds that are external to, and separate from, the publicly available service, by matching the one or more computing resource requirements to temporarily available computing resources of the one or more private clouds;
determine respective amounts of time involved for the one or more private clouds to obtain software to run the one or more applications;
select a particular private cloud to host the one or more applications based at least on the respective amounts of time involved for the one or more private clouds to obtain the software to run the one or more applications; and
initiate control of a hosting activity of execution of the one or more applications on the particular private cloud.

7. The system of claim 6, wherein the executable code causes the at least one processor to:
determine spare capacity computing resources that are available at the one or more private clouds, based at least on resource availability descriptions received from the one or more private clouds; and
select the particular private cloud to host the one or more applications based at least on a determination that particular spare capacity computing resources of the particular private cloud satisfy the one or more computing resource requirements.

8. The system of claim 7, wherein the executable code causes the at least one processor to:
a perform an analysis of performance criteria of the spare capacity computing resources that are available at the one or more private clouds; and
select the particular private cloud to host the one or more applications based at least on the analysis of performance criteria.

9. The system of claim 8, wherein the performance criteria include one or more of:
time to initial response to a client request directed to the one or more applications,
average response time of the one or more applications over multiple requests, and
reliability of the one or more private clouds.

10. The system of claim 6, wherein the executable code causes the at least one processor to:
perform an analysis of cost criteria of spare capacity computing resources that are available at the one or more private clouds, and bandwidth costs for accessing the spare capacity computing resources; and
select the particular private cloud to host the one or more applications based at least on the analysis of the cost criteria and the bandwidth costs.

11. The system of claim 6, wherein the executable code causes the at least one processor to:
select the particular private cloud to host the one or more applications using:
a multi-criteria optimization technique,
an automated mediated auction, or
a rule-based allocation technique.

12. The system of claim 6, wherein the executable code causes the at least one processor to:
select the particular private cloud to host the one or more applications using:
an integer linear programming technique,
branch and bound heuristics, or
a greedy optimization technique.

13. The system of claim 6, wherein the executable code causes the at least one processor to:
monitor spare capacity computing resources that are dynamically available at the one or more private clouds; and dynamically select and release individual computing resources of the one or more private clouds over time as availability of the individual computing resources changes over time.

14. The system of claim 13, wherein the executable code causes the at least one processor to:
monitor the spare capacity computing resources for time slots of predetermined temporal intervals; and
select and release the individual computing resources during the time slots.

15. The system of claim 14, wherein the executable code causes the at least one processor to:
determine, for each of the time slots, a list of spare capacity computing resources that are dynamically available at the one or more private clouds, based at least on resource availability descriptions that are dynamically received from the one or more private clouds over time;
determine, for each of the time slots, a list of cost constraints and performance constraints associated with the respective descriptions of the one or more computing resource requirements for execution of the one or more applications, and
perform dynamic optimization of allocation access to the spare capacity computing resources over time.

16. The system of claim 15, wherein the dynamic optimization employs:
a dynamic optimization technique,
a Viterbi Algorithm technique, or
a multi-slot optimization technique.

17. A method comprising:
obtaining descriptions of one or more computing resource requirements for execution of one or more applications associated with a plurality of dynamically changing workloads, the one or more applications being provided by a publicly available service;
identifying private clouds that are external to, and separate from, the publicly available service, by matching the one or more computing resource requirements to temporarily available computing resources of the private clouds;
determining respective amounts of time involved for the private clouds to obtain software to run the one or more applications;
selecting a particular private cloud to host the one or more applications based at least on the respective amounts of time involved for the private clouds to obtain the software to run the one or more applications; and
causing the one or more applications to be hosted on the particular private cloud.

18. The method of claim 17, further comprising:
based at least on the respective amounts of time involved for the private clouds to obtain the software to run the application, determining respective first response times for the private clouds to respond to a first request from a client; and
selecting the particular private cloud from among the private clouds based at least on the respective first response times.

19. The method of claim 17, further comprising:
receiving, at a public cloud that hosts the one or more applications, a client request directed to the one or more applications; and
routing the client request to the particular private cloud.

20. The method of claim 19, further comprising:
causing a client that submits the client request to send subsequent requests directly to the particular private cloud rather than to the public cloud.

* * * * *